(12) United States Patent
Tran et al.

(10) Patent No.: US 11,003,322 B2
(45) Date of Patent: May 11, 2021

(54) GENERATING MESSAGING STREAMS WITH ANIMATED OBJECTS

(71) Applicant: Google LLC, Mountain View, CA (US)

(72) Inventors: Thanh Tran, Mountain View, CA (US); Eric Wilcox, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/702,432

(22) Filed: Dec. 3, 2019

(65) Prior Publication Data
US 2020/0104017 A1    Apr. 2, 2020

Related U.S. Application Data

(63) Continuation of application No. 15/398,497, filed on Jan. 4, 2017, now abandoned.

(51) Int. Cl.
*G06F 3/0482* (2013.01)
*G06T 13/00* (2011.01)
(Continued)

(52) U.S. Cl.
CPC .......... *G06F 3/0482* (2013.01); *G06F 3/0346* (2013.01); *G06F 3/0488* (2013.01);
(Continued)

(58) Field of Classification Search
CPC .................................................. G06F 3/0482
(Continued)

(56) References Cited

U.S. PATENT DOCUMENTS 5,880,731 A * 3/1999 Liles ..................... G06F 3/0481
345/473
6,570,563 B1 * 5/2003 Honda ..................... G06T 19/00
345/419
(Continued)

FOREIGN PATENT DOCUMENTS

WO    2016/197074    12/2016

OTHER PUBLICATIONS

WIPO, International Search Report for International Patent Application No. PCT/US2017/057527, dated Jan. 2, 2018, 5 pages.
(Continued)

*Primary Examiner* — Daniel Rodriguez
(74) *Attorney, Agent, or Firm* — IP Spring

(57) ABSTRACT

A method for generating a messaging stream where one or more messages are exchanged between a first user and a second user comprises generating a messaging stream where one or more messages are exchanged between a first user and a second user. The method further includes receiving a selection of an animated object from the first user for the messaging stream. The method further includes providing the animated object in the messaging stream. The method further includes receiving a first action from the first user related to the animated object. The method further includes modifying a display of the animated object based on the first action. The method further includes receiving a second action from the second user related to the animated object. The method further includes modifying the display of the animated object based on the second action.

20 Claims, 13 Drawing Sheets

US 11,003,322 B2
Page 2

(51) Int. Cl.
| | |
|---|---|
| *G06F 3/0346* | (2013.01) |
| *G06F 3/0488* | (2013.01) |
| *G06F 3/0484* | (2013.01) |
| *H04L 12/58* | (2006.01) |
| *G06Q 10/10* | (2012.01) |
| *G06Q 50/00* | (2012.01) |

(52) U.S. Cl.
CPC ......... *G06F 3/04845* (2013.01); *G06Q 10/10* (2013.01); *G06Q 50/01* (2013.01); *G06T 13/00* (2013.01); *H04L 51/10* (2013.01)

(58) Field of Classification Search
USPC .................................................. 715/732
See application file for complete search history.

(56) References Cited

U.S. PATENT DOCUMENTS

| | | | | |
|---|---|---|---|---|
| 7,464,337 | B2* | 12/2008 | Han | H04L 51/04 715/738 |
| 8,239,487 | B1* | 8/2012 | Hoffman | G06F 3/04815 709/218 |
| 8,508,469 | B1* | 8/2013 | Rosenberg | G06F 3/011 345/156 |
| 8,531,447 | B2* | 9/2013 | Walker | G06Q 10/10 345/418 |
| 9,634,855 | B2* | 4/2017 | Poltorak | G06K 9/00302 |
| 2001/0033298 | A1* | 10/2001 | Slotznick | H04L 51/04 715/758 |
| 2002/0097267 | A1* | 7/2002 | Dinan | H04L 29/06 715/757 |
| 2006/0212818 | A1* | 9/2006 | Lee | H04L 51/38 715/753 |
| 2007/0002057 | A1* | 1/2007 | Danzig | A63F 13/63 345/473 |
| 2007/0113181 | A1* | 5/2007 | Blattner | G06F 3/011 715/706 |
| 2007/0168863 | A1* | 7/2007 | Blattner | H04L 51/04 715/706 |
| 2007/0180402 | A1* | 8/2007 | Bassemir | G06Q 10/10 715/798 |
| 2007/0294384 | A1* | 12/2007 | Nakajima | H04L 67/1059 709/223 |
| 2008/0090553 | A1* | 4/2008 | Wan | H04M 3/5315 455/413 |
| 2008/0109741 | A1* | 5/2008 | Messing | G06Q 10/10 715/764 |
| 2008/0141147 | A1* | 6/2008 | Buhrke | G06Q 10/10 715/757 |
| 2008/0309618 | A1* | 12/2008 | Okada | A63F 13/10 345/157 |
| 2009/0019117 | A1* | 1/2009 | Bonforte | G06Q 10/107 709/206 |
| 2009/0144143 | A1* | 6/2009 | Iyer | G06Q 30/02 705/14.52 |
| 2009/0158170 | A1* | 6/2009 | Narayanan | H04L 67/306 715/753 |
| 2009/0303676 | A1* | 12/2009 | Behar | G06F 16/9577 361/679.27 |
| 2009/0327899 | A1* | 12/2009 | Bress | G06Q 10/10 715/731 |
| 2010/0001993 | A1* | 1/2010 | Finn | A63F 13/12 345/419 |
| 2010/0045619 | A1* | 2/2010 | Birnbaum | G06F 3/041 345/173 |
| 2010/0083139 | A1* | 4/2010 | Dawson | A63F 13/795 715/757 |
| 2010/0100828 | A1* | 4/2010 | Khandelwal | G06F 3/0481 715/757 |
| 2010/0138756 | A1* | 6/2010 | Saund | H04L 12/1827 715/758 |
| 2010/0153858 | A1* | 6/2010 | Gausman | G06Q 10/101 715/757 |
| 2011/0021109 | A1* | 1/2011 | Le | A63H 13/00 446/300 |
| 2011/0041086 | A1* | 2/2011 | Kim | G06F 3/0488 715/764 |
| 2011/0043443 | A1* | 2/2011 | Kawano | A63F 13/67 345/156 |
| 2011/0055734 | A1* | 3/2011 | Borst | A63F 13/12 715/757 |
| 2011/0106662 | A1* | 5/2011 | Stinchcomb | G06Q 30/0617 705/26.43 |
| 2011/0190060 | A1* | 8/2011 | Ketabdar | A63F 13/428 463/37 |
| 2011/0248992 | A1* | 10/2011 | van Os | G06T 11/60 345/419 |
| 2011/0264491 | A1* | 10/2011 | Birnbaum | G06F 9/451 705/14.4 |
| 2011/0265018 | A1* | 10/2011 | Borst | A63F 13/795 715/757 |
| 2012/0041903 | A1* | 2/2012 | Beilby | G06N 20/00 706/11 |
| 2012/0240060 | A1* | 9/2012 | Pennington | G06F 1/1618 715/753 |
| 2012/0270578 | A1* | 10/2012 | Feghali | H04L 51/10 455/466 |
| 2013/0073978 | A1* | 3/2013 | Butler | G06Q 10/101 715/741 |
| 2013/0145290 | A1* | 6/2013 | Weber | G06F 3/0483 715/760 |
| 2014/0122619 | A1* | 5/2014 | Duan | G06F 40/20 709/206 |
| 2014/0139450 | A1* | 5/2014 | Levesque | G06F 3/016 345/173 |
| 2014/0240364 | A1* | 8/2014 | Ishikawa | G09G 5/34 345/684 |
| 2014/0300612 | A1* | 10/2014 | Li | A63F 13/79 345/473 |
| 2014/0372541 | A1* | 12/2014 | Feghali | H04L 51/18 709/206 |
| 2014/0372923 | A1* | 12/2014 | Rossi | G06F 3/0488 715/769 |
| 2015/0011277 | A1* | 1/2015 | Wakeford | A63F 13/00 463/1 |
| 2015/0040036 | A1* | 2/2015 | Crocker | G06F 3/04815 715/757 |
| 2015/0058140 | A1* | 2/2015 | Dixon | G06Q 30/0277 705/14.73 |
| 2015/0121255 | A1* | 4/2015 | Lee | G06Q 10/10 715/758 |
| 2015/0172599 | A1* | 6/2015 | Caldwell | H04N 7/142 348/14.03 |
| 2015/0220244 | A1* | 8/2015 | Vats | G06F 3/011 715/850 |
| 2015/0309696 | A1* | 10/2015 | Leahy | H04W 4/02 715/757 |
| 2015/0334075 | A1* | 11/2015 | Wang | H04L 67/10 715/752 |
| 2015/0365306 | A1* | 12/2015 | Chaudhri | G06F 3/0484 715/736 |
| 2016/0005320 | A1* | 1/2016 | deCharms | A61B 8/0808 434/236 |
| 2016/0048908 | A1* | 2/2016 | Sibai | G06Q 30/0643 705/14.1 |
| 2016/0259526 | A1* | 9/2016 | Lee | H04L 51/10 |
| 2016/0357407 | A1* | 12/2016 | Rogoway | G06T 13/80 |
| 2017/0041272 | A1* | 2/2017 | Chang | G06F 3/0488 |
| 2017/0090699 | A1* | 3/2017 | Pennington | G06F 1/1616 |
| 2017/0124770 | A1* | 5/2017 | Vats | G06T 19/003 |
| 2017/0246545 | A1* | 8/2017 | Wilhite | H04L 51/046 |
| 2017/0250936 | A1* | 8/2017 | Rosenberg | H04L 51/18 |
| 2017/0293834 | A1* | 10/2017 | Raison | H04L 51/02 |
| 2017/0322693 | A1* | 11/2017 | Zhang | G06F 3/0484 |
| 2017/0324693 | A1* | 11/2017 | Xiao | H04L 51/18 |
| 2017/0345079 | A1* | 11/2017 | Rangan | G06Q 30/0633 |
| 2017/0353404 | A1* | 12/2017 | Hodge | H04L 67/02 |
| 2018/0026925 | A1* | 1/2018 | Kennedy | G06K 9/00302 715/753 |

(56) References Cited

U.S. PATENT DOCUMENTS

| | | | |
|---|---|---|---|
| 2018/0059903 A1* | 3/2018 | Lim | G06F 3/04817 |
| 2018/0068490 A1* | 3/2018 | Holmes | H04N 7/141 |
| 2018/0174222 A1* | 6/2018 | Venkatakrishnan | H04L 51/02 |
| 2018/0181855 A1* | 6/2018 | Johnson, Jr. | G06N 3/006 |
| 2018/0183737 A1* | 6/2018 | Subbarayan | G06Q 20/3223 |
| 2018/0188905 A1* | 7/2018 | Tran | G06F 3/0482 |

OTHER PUBLICATIONS

WIPO, Written Opinion for International Patent Application No. PCT/US2017/057527, dated Jan. 2, 2018, 7 pages.

WIPO, Written Opinion of the International Preliminary Examining Authority for International Patent Application No. PCT/US2017/057527, dated May 28, 2018, 6 pages.

WIPO, International Preliminary Report on Patentability for International Patent Application No. PCT/US2017/057527, dated Jul. 9, 2019, 7 pages.

USPTO, Final Office Action for U.S. Appl. No. 15/398,497, dated Jan. 10, 2019, 26 pages.

USPTO, First Action Interview, Pre-Interview Communication for U.S. Appl. No. 15/398,497, dated Jul. 25, 2018, 23 pages.

USPTO, Non-final Office Action for U.S. Appl. No. 15/398,497, dated May 1, 2019, 27 pages.

USPTO, Final Office Action for U.S. Appl. No. 15/398,497, dated Oct. 7, 2019, 29 pages.

USPTO, First Action Interview, Office Action Summary for U.S. Appl. No. 15/398,497, dated Sep. 27, 2018, 24 pages.

\* cited by examiner

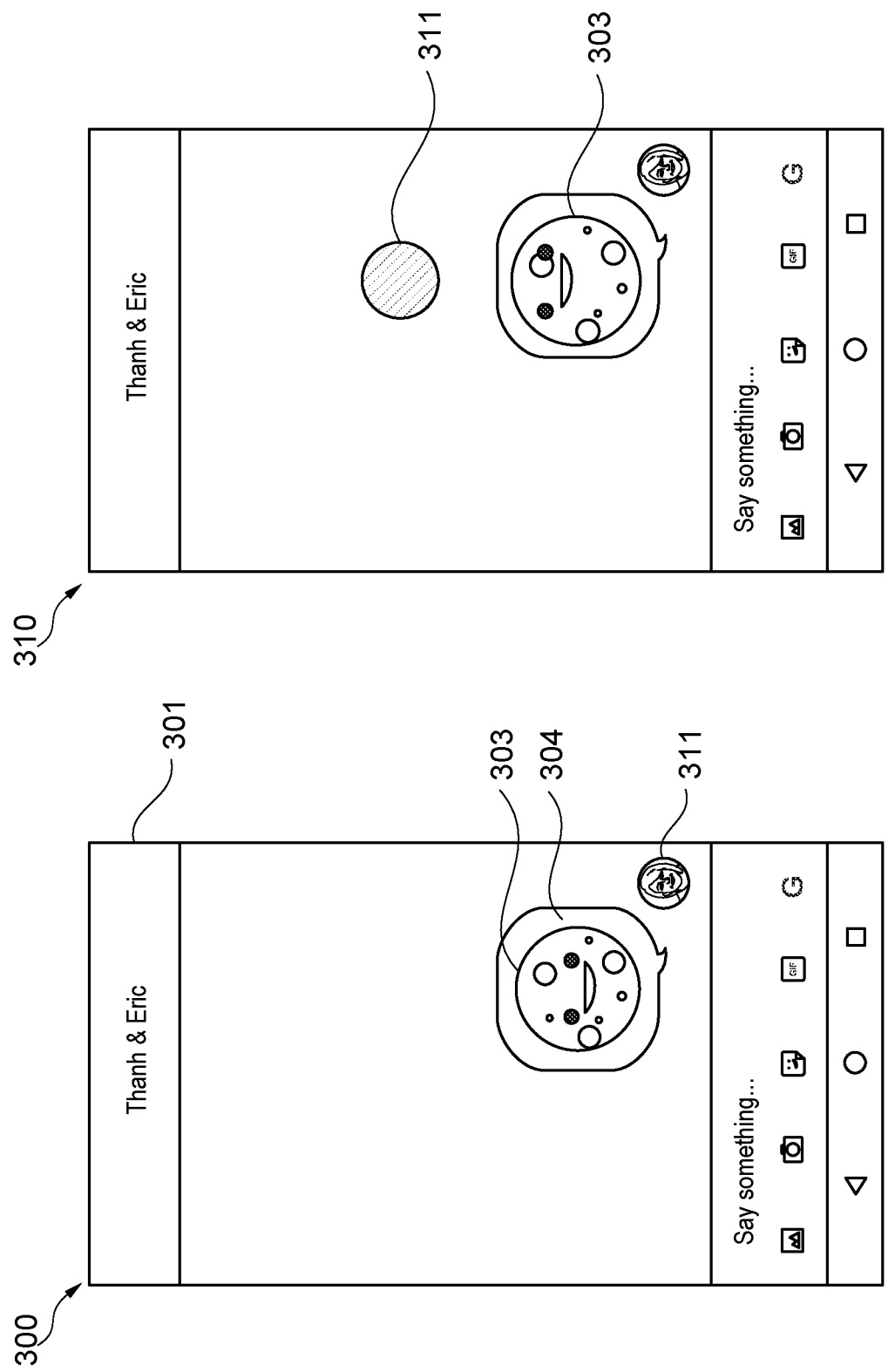

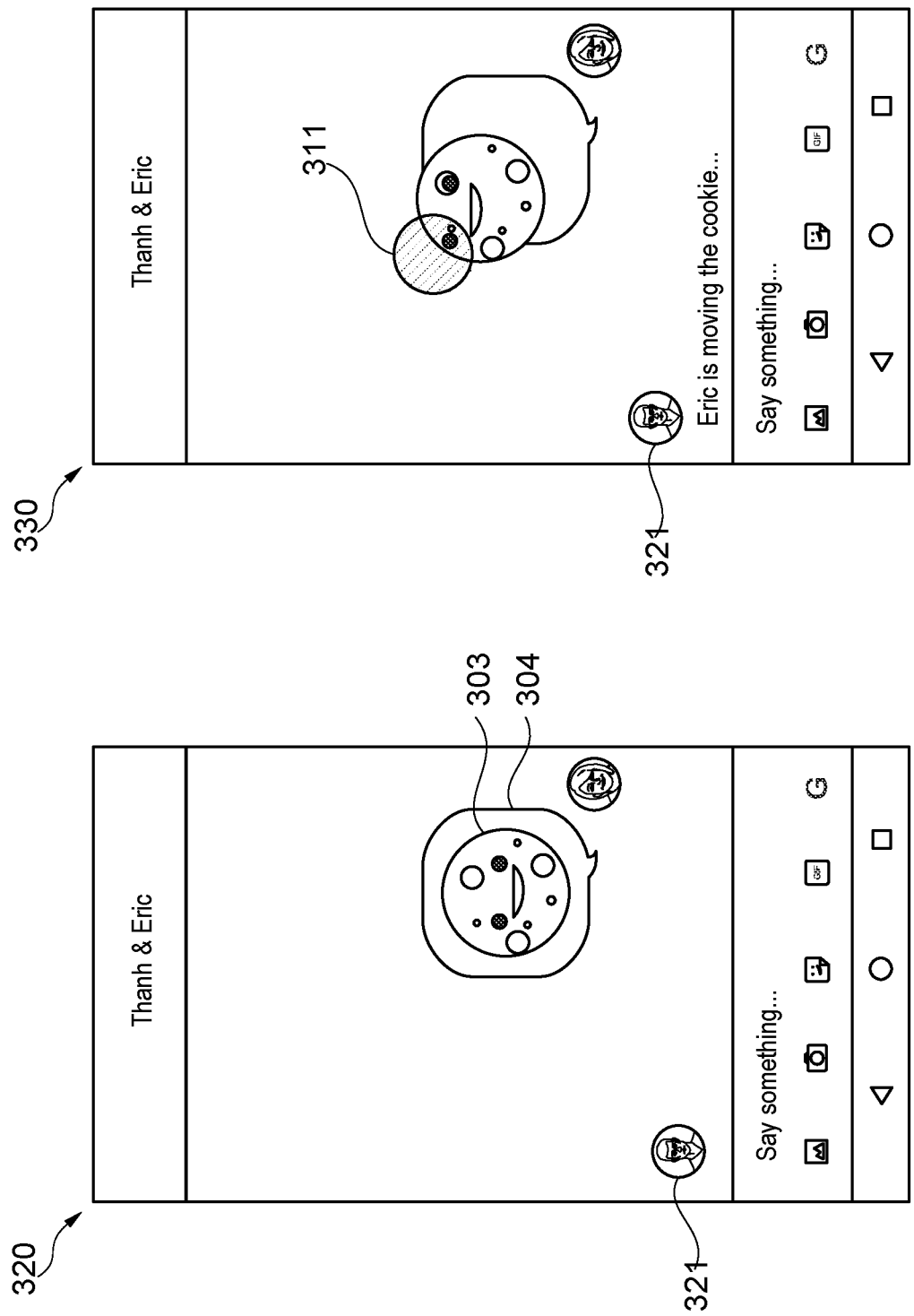

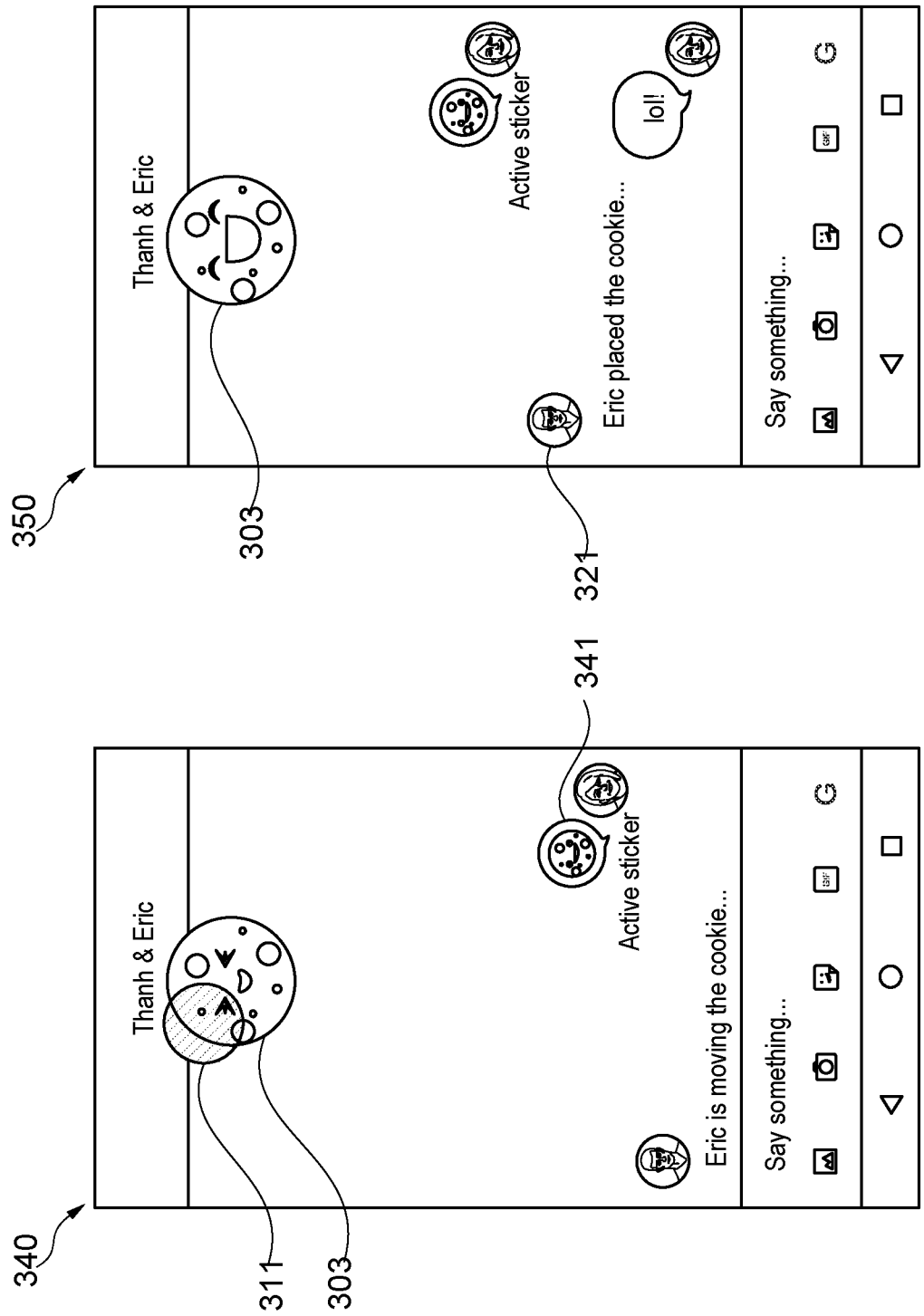

GENERATING MESSAGING STREAMS WITH ANIMATED OBJECTS

CROSS-REFERENCE TO RELATED APPLICATION

The present application is a continuation of U.S. patent application Ser. No. 15/398,497, filed Jan. 4, 2017 and titled GENERATING MESSAGING STREAMS WITH ANIMATED OBJECTS, the contents of which is hereby incorporated by reference in its entirety.

BACKGROUND

Current messaging applications allow for non-interactive, one-directional objects in the form of stickers, emojis, photos, GIFs, and sounds. However, these one-directional objects may be considered fleeting because they are limited in applicability. For example, a first user may send an emoji to a second user, who finds the emoji to be funny, but then forgets about the emoji entirely.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations generally relate to a computer-implemented method to generate a messaging stream where one or more messages are exchanged between a first user and a second user. The method may include generating a messaging stream where one or more messages are exchanged between a first user and a second user. The method further includes receiving a selection of an animated object from the first user for the messaging stream. The method further includes providing the animated object in the messaging stream. The method further includes receiving a first action from the first user related to the animated object. The method further includes modifying a display of the animated object based on the first action. The method further includes receiving a second action from the second user related to the animated object. The method further includes modifying the display of the animated object based on the second action.

In some implementations, receiving the first action from the first user includes detecting a change in airflow near a microphone associated with a user device. In some implementations, receiving the first action from the first user includes detecting movement of a finger on a touch screen or detection of movement of a pointing device. In some implementations, receiving the first action from the first user includes detecting movement of a user device based on information received from a sensor associated with the user device. In some implementations, receiving the first action from the first user includes receiving a message from the first user and determining a context from the messaging stream and modifying a display of the animated object based on the first action includes modifying the display of the animated object based on the context from the messaging stream. In some implementations, the first action is pulling the animated object in a first direction and the second action is pulling the animated object in a second direction. In some implementations, the method further comprises displaying the one or more messages within the messaging stream while the animated object remains fixed in a portion of the messaging stream. In some implementations, the first user is a chat bot and the animated object is related to the one or more messages exchanged between the first user and the second user. In some implementations, the display of the animated object is modified based on at least one of a word in the one or more messages, voice content, and a context of the messaging stream. In some implementations, the method further comprises identifying a set of objects to provide as options to the first user based on a type of user device on which the messaging stream is displayed, wherein the animated object is part of the set of objects.

In some implementations, the method includes generating a messaging stream where one or more messages are exchanged between a first user and a second user. The method further includes receiving a selection of an animated object from the first user for the messaging stream. The method further includes causing a version of the animated object to be displayed based on a type of user device on which the animated object is displayed. The method further includes receiving an action from the second user related to the animated object. The method further includes in response to receiving the action, modifying the display of the animated object.

In some implementations, the selection is a first selection and the animated object is a first animated object and the method further comprises providing the second user with a set of animated objects based on their relationship to the first object, receiving a second selection of a second animated object from the set of animated objects, and in response to the receiving the second selection, providing the second object in the messaging stream. In some implementations, the version of the animated object to be displayed based on the type of user device on which the animated object is displayed includes a complicated version for a desktop computer, a simpler version for a mobile device, and a more simple version for a smart watch. In some implementations, the selection is a first selection, the animated object is a first animated object, the action from the second user includes a second selection of a second animated object from the second user for the messaging stream, and modifying the display of the first animated object includes the first animated object interacting with the second animated object.

In some implementations, the method may include means for generating a messaging stream where one or more messages are exchanged between a first user and a second user. The method further includes means for receiving a selection of an animated object from the first user for the messaging stream. The method further includes means for providing the animated object in the messaging stream. The method further includes means for receiving a first action from the first user related to the animated object. The method further includes means for modifying a display of the animated object based on the first action. The method further includes means for receiving a second action from the second user related to the animated object. The method further includes means for modifying the display of the animated object based on the second action.

The various implementations described below provide messaging streams that include interactive animated objects. The animated objects described below may include multimedia features, such as features that can be displayed on a display screen, projected in a virtual reality environment, played back as audio, played back via haptic feedback, or a combination of such modalities. In various implementations, based on user consent, the animated objects react to user input, messages exchanged in the messaging stream, messaging context, and a combination of such factors. Interactive animated objects may provide several advantages. For example, such animated objects may enhance the user experience of using a messaging application that implements the messaging stream, e.g., by enabling users to express themselves in interactive ways, rather than being restricted to sending text, images, or stock items such as animated GIF, stickers, and emoji. Further, in implementations that provide animated objects in messaging streams that include multiple users, the animated objects may be acted upon concurrently, or sequentially, by multiple users. Such interactivity may provide geographically separated users an experience of collaboratively modifying an object. A further benefit is that behaviors of the objects may be customizable by users.

The implementations provided herein efficiently provide interactive animated objects in a messaging stream. For example, the animated objects may be preprogrammed for certain behaviors, e.g., may be configured to respond to various user actions, messaging context, etc. by being modified or displayed in accordance with the user actions or context. In this manner, a technical advantage is that a large or even infinite number of behaviors of animated objects may be provided by a combination of preprogrammed behaviors, without the need to explicitly specify each behavior. This can permit complex animated objects to be stored and displayed with limited computational resources. Animated objects may be downloaded or accessed on demand, e.g., only upon insertion of the animated object in the messaging stream, which reduces storage space required to store the objects. Different versions of an animated object may be provided, as described below, for different user devices. Therefore, devices with limited storage space, network access capacity, and processing power, can still render a suitable version of an animated object. Thus, implementations described below provide animated objects in messaging streams for different types of user devices, without the need for device-specific reconfiguration.

BRIEF DESCRIPTION OF THE DRAWINGS

The disclosure is illustrated by way of example, and not by way of limitation in the figures of the accompanying drawings in which like reference numerals are used to refer to similar elements.

FIG. 3A illustrates an example user interface of a messaging stream that includes an animated cookie according to some implementations.

FIG. 3B illustrates an example user interface of a messaging stream that includes the animated cookie with eyes that follow a pointing device controlled by a first user according to some implementations.

FIG. 3C illustrates an example user interface of a messaging stream that includes the animated cookie that is viewable by multiple users according to some implementations.

FIG. 3D illustrates an example user interface of a messaging stream that includes the animated cookie with eyes that follow a cursor controlled by a second user according to some implementations.

FIG. 3E illustrates an example user interface of a messaging stream that includes the animated cookie that reacts to being moved according to some implementations.

FIG. 3F illustrates an example user interface of a messaging stream that includes the animated cookie that reacts to being placed according to some implementations.

DETAILED DESCRIPTION

In some implementations, a messaging application generates a messaging stream where messages are exchanged between a first user and a second user. The messaging application may receive a selection of an animated object from the first user for the messaging stream. For example, the first user may select an animated bubble to add to the messaging stream. The messaging application may add the animated object to the messaging stream. For example, the first user and the second user may view the animated bubble in the messaging stream.

The messaging application may receive a first action from the first user related to the animated object. For example, the first user may blow into a user device and the user device detects a change in airflow near the microphone. The messaging application may modify a display of the animated object based on the first action. For example, the messaging application may show the bubble as moving upwards based on the user blowing into the user device. The messaging application may receive a second action from the second user related to the animated object. For example, the messaging application may receive indications based on the second user pulling the bubble with a finger on the user device. The messaging application may modify the display of the animated object based on the second action. For example, the messaging application may show the bubble as stretching in the direction corresponding to the movement of the finger and then popping.

Example System

Figure 1:
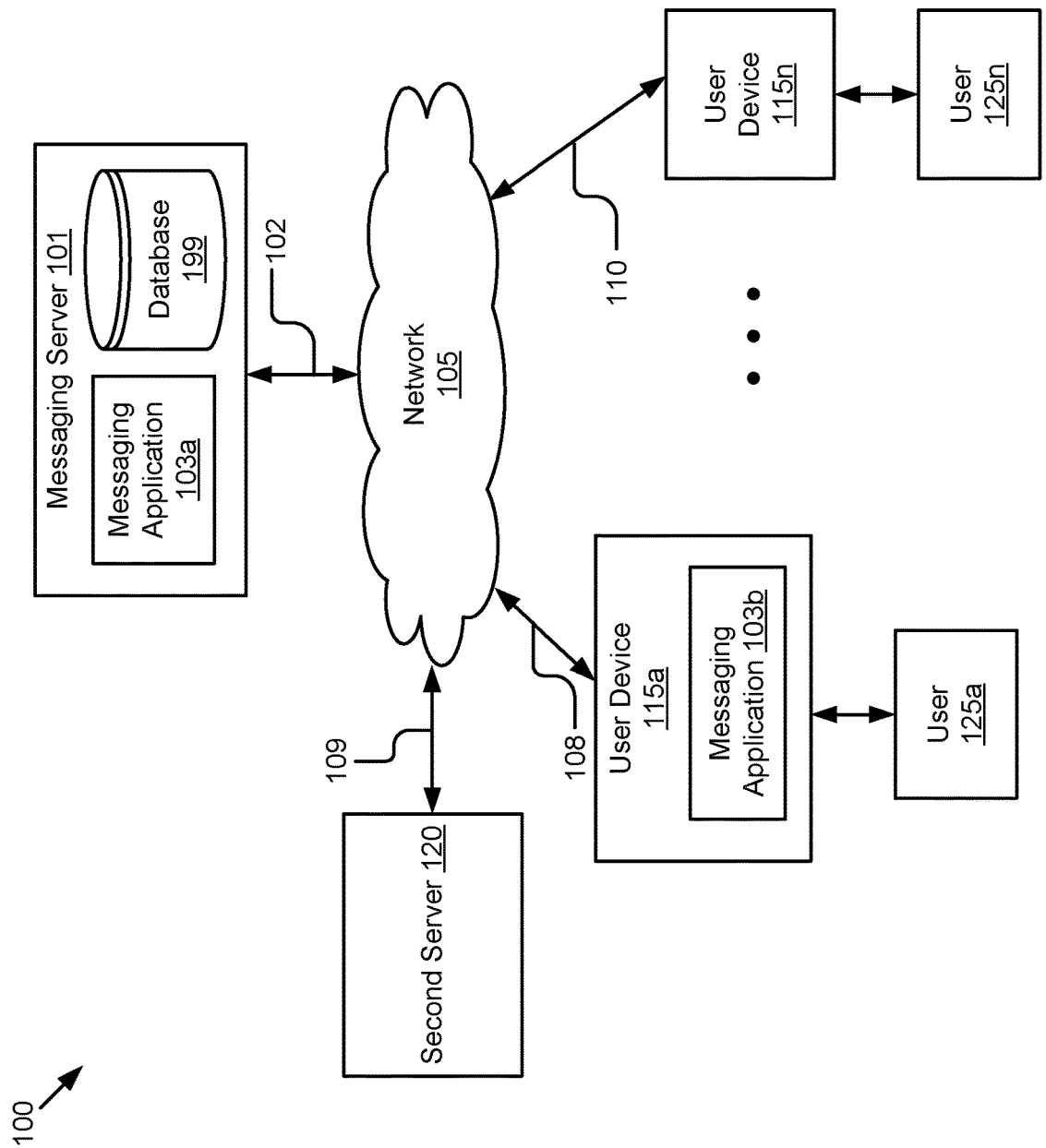
FIG. 1 illustrates a block diagram of an example system that generates a messaging stream with an animated object according to some implementations.

FIG. 1 illustrates a block diagram of an example system 100 that generates a messaging stream that includes an animated object. The illustrated system 100 includes a messaging server 101, user devices 115a, 115n, a second server 120, and a network 105. Users 125a, 125n may be associated with respective user devices 115a, 115n. In some implementations, the system 100 may include other servers or devices not shown in FIG. 1. In FIG. 1 and the remaining figures, a letter after a reference number, e.g., "115a," represents a reference to the element having that particular reference number. A reference number in the text without a following letter, e.g., "115," represents a general reference to implementations of the element bearing that reference number.

The messaging server 101 may include a processor, a memory, and network communication capabilities. In some implementations, the messaging server 101 is a hardware server. The messaging server 101 is communicatively coupled to the network 105 via signal line 102. Signal line 102 may be a wired connection, such as Ethernet, coaxial cable, fiber-optic cable, etc., or a wireless connection, such as Wi-Fi®, Bluetooth®, or other wireless technology. In some implementations, the messaging server 101 sends and receives data to and from one or more of the user devices 115a, 115n and the second server 120 via the network 105. The messaging server 101 may include a messaging application 103a and a database 199.

The messaging application 103a may be code and routines operable to generate a messaging stream that includes an animated object. In some implementations, the messaging application 103a may be implemented using hardware including a field-programmable gate array (FPGA) or an application-specific integrated circuit (ASIC). In some implementations, the messaging application 103a may be implemented using a combination of hardware and software.

The database 199 may store animated objects, messaging streams, etc. For example, the database 199 may store the messages between a first user and a second user. The database 199 may also store social network data associated with users 125, user preferences for the users 125, etc.

The user device 115 may be a computing device that includes a memory and a hardware processor. For example, the user device may include a desktop computer, a mobile device, a tablet computer, a mobile telephone, a wearable device, a head-mounted display, a mobile email device, a portable game player, a portable music player, a reader device, or another electronic device capable of accessing a network 105.

In the illustrated implementation, user device 115a is coupled to the network 105 via signal line 108 and user device 115n is coupled to the network 105 via signal line 110. Signal lines 108 and 110 may be a wired connection, such as Ethernet, coaxial cable, fiber-optic cable, etc., or a wireless connection, such as Wi-Fi®, Bluetooth®, or other wireless technology. User devices 115a, 115n are accessed by users 125a, 125n, respectively. The user devices 115a, 115n in FIG. 1 are used by way of example. While FIG. 1 illustrates two user devices, 115a and 115n, the disclosure applies to a system architecture having one or more user devices 115.

In some implementations, the user device 115 can be a user device that is included in a wearable device worn by the user 125. For example, the user device 115 is included as part of a clip (e.g., a wristband), part of jewelry, or part of a pair of glasses. In another example, the user device 115 can be a smart watch. The user 125 may view an animated object from the messaging application 103 on a display of the device worn by the user 125. For example, the user 125 may view the animated object on a display of a smart watch or a smart wristband.

In some implementations, messaging application 103b may be stored on a user device 115a. The messaging application 103 may include a thin-client messaging application 103b stored on the user device 115a and a messaging application 103a that is stored on the messaging server 101. For example, the messaging application 103b stored on the user device 115a may display a messaging stream that includes an animated object. The user device 115a may identify a user action from a first user, such as shaking the user device 115a to make snow fall over an animated object of a snowman. The user device 115a may transmit information about the messaging stream and the user action to the messaging application 103a stored on the messaging server 101, which provides the information to a second user that accesses the messaging application 103a from a desktop computer.

The second server 120 may include a processor, a memory, and network communication capabilities. The second server 120 may access the network 105 via signal line 109. The second server 120 may receive information from the messaging application 103 about the messaging stream and provide information to the messaging application 103. For example, the second server 120 may be associated with a bank and the second server 120 may communicate with the messaging application 103 to pay a bill using the bank information. A user 125 may instruct the messaging application 103 to authorize the second server 120 to pay a bill by clicking on an animated object of a bag of money. Once the transaction is complete, the second server 120 may send the messaging application 103 a notification that the transaction is complete. The messaging application 103 may modify the animated object to show the money moving from the money bag to the bank associated with the second server 120. In another example, the second server 120 may include a bot that performs functions for a user 125, such as ordering food, scheduling an appointment, making a reservation, booking a flight, etc. In yet another example, the second server 120 may include a separate application that provides information to the messaging application 103, such as a calendar application that sends, upon user consent, information about the user's meetings.

In the illustrated implementation, the entities of the system 100 are communicatively coupled via a network 105. The network 105 may be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some implementations, the network 105 may be a peer-to-peer network. The network 105 may also be coupled to or include portions of a telecommunications network for sending data in a variety of different communication protocols. In some implementations, the network 105 includes Bluetooth® communication networks, WiFi®, or a cellular communications network for sending and receiving data including via short messaging service (SMS), multimedia messaging service (MMS), hypertext transfer protocol (HTTP), direct data connection, email, etc. Although FIG. 1 illustrates one network 105 coupled to the user devices 115 and the messaging server 101, in practice one or more networks 105 may be coupled to these entities.

In situations in which the systems and methods discussed herein may collect or use personal information about users (e.g., user data, information about a user's social network, user's location, user's biometric information, user's activities and demographic information, the messaging server stores and analyzes videos), users are provided with opportunities to control whether information is collected, whether the personal information is stored, whether the personal information is used, whether the videos are analyzed, and how the information about the user is collected, stored, and used. That s the systems and methods discussed herein collect, store, and/or use user personal information only upon explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity information may be treated, e.g., anonymized, so that no personally identifiable information can be determined from a video. As another example, a user's geographic location may be generalized to a larger region so that sees particular location cannot be determined.

Example Computing Device

Figure 2:
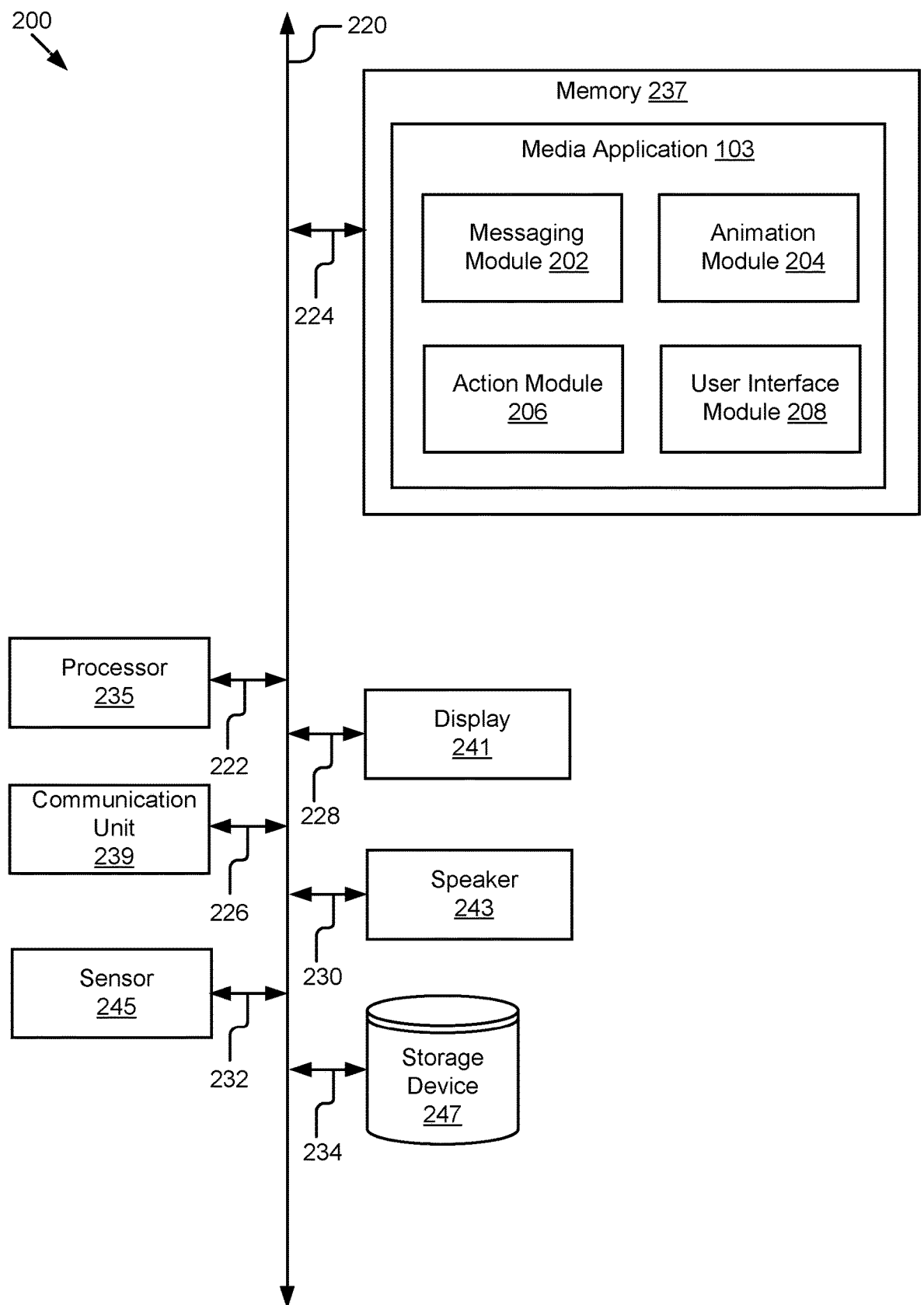
FIG. 2 illustrates a block diagram of an example computing device that generates the messaging stream with the animated object according to some implementations.

FIG. 2 illustrates a block diagram of an example computing device 200 that generates composite images. The computing device 200 may be a messaging server 101 or a user device 115. The computing device 200 may include a processor 235, a memory 237, a communication unit 239, a display 241, a speaker 243, a sensor 245, and a storage device 247. Additional components may be present or some of the previous components may be omitted depending on the type of computing device 200. For example, if the computing device 200 is the messaging server 101, the computing device 200 may not include the display 241, the speaker 243, or the sensor 245. A messaging application 103 may be stored in the memory 237. In implementations where the computing device 200 is a wearable device, the computing device 200 may not include storage device 247. In some implementations, the computing device 200 may include other components not listed here, such as a battery, etc. The components of the computing device 200 may be communicatively coupled by a bus 220.

The processor 235 includes an arithmetic logic unit, a microprocessor, a general purpose controller or some other processor array to perform computations and provide instructions to a display device. Processor 235 processes data and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays and physical configurations may be part of the computing device 200. The processor 235 is coupled to the bus 220 for communication with the other components via signal line 222.

The memory 237 stores instructions that may be executed by the processor 235 and/or data. The instructions may include code for performing the techniques described herein. The memory 237 may be a dynamic random access memory (DRAM) device, a static RAM, or some other memory device. In some implementations, the memory 237 also includes a non-volatile memory, such as a (SRAM) device or flash memory, or similar permanent storage device and media including a hard disk drive, a compact disc read only memory (CD-ROM) device, a DVD-ROM device, a DVD-RAM device, a DVD-RW device, a flash memory device, or some other mass storage device for storing information on a more permanent basis. The memory 237 includes code and routines operable to execute the messaging application 103, which is described in greater detail below. The memory 237 is coupled to the bus 220 for communication with the other components via signal line 224.

The communication unit 239 transmits and receives data to and from at least one of the user device 115 and the messaging server 101 depending upon where the messaging application 103 may be stored. In some implementations, the communication unit 239 includes a port for direct physical connection to the network 105 or to another communication channel. For example, the communication unit 239 includes a universal serial bus (USB), secure digital (SD), category 5 cable (CAT-5) or similar port for wired communication with the user device 115 or the messaging server 101, depending on where the messaging application 103 may be stored. In some implementations, the communication unit 239 includes a wireless transceiver for exchanging data with the user device 115, messaging server 101, or other communication channels using one or more wireless communication methods, including IEEE 802.11, IEEE 802.16, Bluetooth® or another suitable wireless communication method. The communication unit 239 is coupled to the bus 220 for communication with the other components via signal line 226.

In some implementations, the communication unit 239 includes a cellular communications transceiver for sending and receiving data over a cellular communications network including via short messaging service (SMS), multimedia messaging service (MMS), hypertext transfer protocol (HTTP), direct data connection, e-mail or another suitable type of electronic communication. In some implementations, the communication unit 239 includes a wired port and a wireless transceiver. The communication unit 239 also provides other conventional connections to the network 105 for distribution of files and/or media objects using standard network protocols including, but not limited to, user datagram protocol (UDP), TCP/IP, HTTP, HTTP secure (HTTPS), simple mail transfer protocol (SMTP), SPDY, quick UDP internet connections (QUIC), etc.

The display 241 may include hardware operable to display graphical data received from the messaging application 103. For example, the display 241 may render graphics to display an overlay and a resulting composite image. The display 241 is coupled to the bus 220 for communication with the other components via signal line 228.

The speaker 243 may include hardware operable to emit noises. For example, in response to a user performing an action, the action module 206 may instruct the speaker 243 to emit a sound. The speaker is coupled to the buss 220 for communication with the other components via signal line 230.

The sensor 245 may include hardware operable to detect changes to the user device 115. For example, the sensor 245 may include motion sensors that measure movement of the computing device 200. For example, the sensor 245 may include an accelerometer and a gyroscope that detect acceleration forces and rotational forces along the x, y, and z-axes. The sensor 245 may also include position sensors that measure the physical position of the user device 115, such as orientation sensors and magnetometers. The sensor 245 may also include hardware that detects sounds and/or pressure changes, such as a microphone that detects changes in airflow when a user blows on the computing device 200. The sensor 245 is coupled to the bus 220 for communication and with the other components via signal line 232. The sensor 245 may detect contact on a touch screen of the computing device 200. For example, the sensor 245 may detect a user's finger touching the touch screen and movement of the user's finger.

The storage device 247 may be a non-transitory computer-readable storage medium that stores data that provides the functionality described herein. In implementations where the computing device 200 is the messaging server 101, the storage device 247 may include the database 199 in FIG. 1. The storage device 247 may be a DRAM device, a SRAM device, flash memory or some other memory device. In some implementations, the storage device 247 also includes a non-volatile memory or similar permanent storage device and media including a hard disk drive, a CD-ROM device, a DVD-ROM device, a DVD-RAM device, a DVD-RW device, a flash memory device, or some other mass storage device for storing information on a permanent basis. The storage device 247 is coupled to the bus 220 for communication with the other components via signal line 234.

The messaging application 103 may include a messaging module 202, an animation module 204, an action module 206, and a user interface module 208.

The messaging module 202 generates a messaging stream. In some implementations, the messaging module 202 includes a set of instructions executable by the processor 235 to generate the messaging stream. In some implementations, the messaging module 202 is stored in the memory 237 of the computing device 200 and can be accessible and executable by the processor 235.

In some implementations, the messaging module 202 generates a messaging stream that includes data sent to and from users and chat bots, for example, by sending data to a user device 115, a messaging server 101, and/or a second server 120. The messaging stream may include one or more messages where the messages have certain characteristics, such as a sender; a recipient; and message content including text, an animated object, images, video, and message metadata. The message metadata may include a timestamp, an originating device identifier, an expiration time, a retention time, various formats and effects applied, etc. In some implementations, the messaging stream includes a displayed messaging stream that includes messages displayed in chronological order within a user interface with various formats and effects applied.

The messaging stream may be used as part of different messaging platforms, such as part of an instant messaging application, a short-message service (SMS), an email application, an enhanced-message service (EMS), a multimedia-message service (MMS), push messaging (e.g., HDML, WAP push, etc.), application-to-application messaging, etc. The messages may be available for a limited amount of time, archived for an indeterminate time, etc. The messages may be encrypted. In some implementations, the messaging module 202 generates messages that are independent of the animated objects and inaccessible to the animated objects. In some implementations, the messages are available to the animated objects and are used to modify the display of the animated objects, for example, when an animated object appears to react to content in a message.

In some implementations, the messaging module 202 instructs the user interface module 208 to generate a user interface that includes the messaging stream. The user interface may include fields for entering text, videos, images, emojis, etc. The messaging module 202 receives messages between users and instructs the user interface module 208 to display the messages in the messaging stream. For example, user 125a enters text via the user interface that says "Hey Carl!" The messaging module 202 on the user device 115a transmits the message to user 125n and the message is displayed on the user device 115n. In some implementations, the message is transmitted from the user device 115a to the messaging server 101, which transmits the message to the user device 115n.

The animation module 204 generates animated objects. In some implementations, the animation module 204 includes a set of instructions executable by the processor 235 to generate the animated object. In some implementations, the animation module 204 is stored in the memory 237 of the computing device 200 and can be accessible and executable by the processor 235.

In some implementations, the animation module 204 generates a group of animated objects. The animated objects may include cartoons; caricatures of people (famous people, avatars, generic people, etc.), animals (e.g., a bear), inanimate objects (e.g., a cookie); abstract moving objects (e.g., a swirling pattern with eyes and a mouth); etc.

The animation module 204 may instruct the user interface module 208 to provide the group of animated in a user interface. The animation module 204 may organize the group of animated objects according to type and instruct the user interface module 208 to display an organized group of animated objects from which the user may select an animated object.

In some implementations, the animation module 204 may instruct the user interface module 208 to display options for customizing an animated object. For example, the user interface may include options for selecting a color or a size of an animated object. In some implementations, the options for customizing the animated object may be specific to the type of animated object. For example, the user interface may include an option to select an eye color for animated objects that have eyes. In some implementations, the user interface may include options for limiting the amount of information and/or actions available to the animated object. For example, the user interface may include options for disabling certain behaviors, such as nodding or producing a sound. In another example, the user interface may include options for disabling certain types of actions based on privacy concerns, such as disabling context-based animations that react based on words in the messages, while retaining animations that are in response to explicit user input, such as a user shaking the computing device 200.

In some implementations, the animation module 204 may instruct the user interface module 208 to provide a group of animated objects that are different depending on the type of computing device 200 being used to select an animated object. For example, where the computing device 200 is a smart watch, the group may include a subset of the animated objects that may be appropriate for the display on the smart watch. In some implementations, the group of animated objects may include different versions that are used for different devices. An animated object may include a complicated version for a desktop computer, a simpler version for a mobile device, and a more simple version for a smart watch. For example, an animated object on the desktop may include a cartoon of a man with a background scene, the animated object on the mobile device may include the cartoon of the man, and the animated object on the smart watch may include a cartoon of the man's face.

In some implementations, the animation module 204 may instruct a computing device 200 to provide different attributes of the animated object based on the type of computing device 200. For example, for a single animated object, the animation module 204 may instruct a computing device 200 that corresponds to a smart watch to provide vibrations and/or a sound, a computing device 200 that corresponds to a mobile device to provide a visual display, and a computing device 200 that corresponds to virtual reality goggles to provide a three-dimensional rendition of the user interface. The three-dimensional rendition may including placing the animated object at different depths in the user interface.

The animation module 204 receives a selection of an animated object from a user. The animation module 204 generates the animated object and instructions the user interface module 208 to display the animated object in the messaging stream. The user interface module 208 may display the animated object in different parts of the messaging stream. For example, the user interface module 208 may display the animated object at the top of the user interface, at the bottom of the user interface or in the middle of the user interface. In another example, the user interface module 208 may display the one or more messages within the messaging stream while the animated object remains fixed in a portion of the messaging stream. In yet another example, the user interface module 208 may display the animated object according to a time that the first user selected the animated object so that the animated object is located after content that was provided before the animated object was selected and before content that is provided after the animated object was selected. In yet another example, the user interface module 208 may display the animated object in random locations. The user interface module 208 may also change the location of the animated object based on actions performed by a user, as described in greater detail below.

The user interface module 208 displays the animated object within the user interface for each person that is viewing the same messaging stream. For example, the messaging stream may be viewed by a single user that is making notes for himself, the messaging stream may be viewed by a first user and a second user, or the messaging stream may be viewed by a group of users. In some implementations, the user interface module 208 places the animated object in different locations based on characteristics associated with different users. For example, a first user may provide user input that the first user prefers to see the animated object at the bottom right-hand part of the screen. In another example, the animated object may be located in the center of the messaging stream for users from a group that interact with the animated object and at the top left of the messaging stream for users that have not interacted with the animated object. In some implementations, the animated object is displayed differently depending on the position of the animated object in the messaging stream and/or the time the animated object has been displayed and/or how long since a user action associated with the animated object occurred.

In some implementations, the animated object may look different to multiple users that are viewing the same messaging stream based on metadata associated with each of the users. The metadata may include a time of day associated with a user device, a location associated with a user device, a time zone associated with a user device, user preferences associated with a user, etc. The animation module 204 may obtain information from the sensor 245 to determine information from the metadata. For example, the animation module 204 may determine the user's location, if the user has contented to such a determination by the animation module 204, based on a sensor 245 that provides global positioning system (GPS) information. The animation module 204 may modify an animated object based on the metadata. For example, where the animated object is an animation of a person, the person may wear shorts if the user is located in an area with warm weather, a jacket if the user is located in an area with cold weather, etc. The animation module 204 may display the animation of the person with different clothing or different behavior based on the time of day of the user. For example, the animation module 204 may display the animation of the person in pajamas and the animation may fall asleep if the time of day of the user is at night. In some implementations, upon consent of the user, the animation module 204 may modify the animated object based on user data. For example, the animation module 204 may instruct the user interface module 208 to display the animated object with an alarm that goes off when the user has configured an alarm on the computing device 200, the animated object may display a countdown associated with a timer that the user configured on the computing device 200, the animated object may display an upcoming calendar event based on a calendar entry based on information associated with the second server 120, etc.

In some implementations, the animation module 204 instructs the user interface module 208 to provide the second user with set of animated objects based on their relationships to the first animated object. For example, where the first animated object conveys a message, such as "I'll be home soon," the set of animated objects may include responses to the message. The user interface module 208 may replace a first animated object with the second animated object or the second animated object may be displayed in the same messaging stream as the first animated object. In some implementations, the first animated object and the second animated object interact with each other.

The action module 206 modifies the animated object based on a user action. In some implementations, the action module 206 includes a set of instructions executable by the processor 235 to modify the animated object. For example, the action module 206 may program the animated object (e.g., the animated object may include stored code or a prerecorded animation) to react to the user action. In some implementations, the action module 206 is stored in the memory 237 of the computing device 200 and can be accessible and executable by the processor 235.

The action module 206 receives a first action from a first user related to the animated object. The action module 206 determines a type of action that occurred and instructs the user interface module 208 to modify a display of the animated object based on the action. For example, when the first user taps on an animated object, the action module 206 instructs the user interface module 208 to display hearts coming off of the animated object. In some implementations, the users that view the same messaging stream will see the hearts coming off of the animated object. The action module 206 receives a second action from a second user related to the animated object. For example, the second user makes a swiping motion, which the action module 206 detects. The action module 206 instructs the user interface module 208 to modify the display based on the second action. Continuing with the example above, the action module 206 instructs the user interface module 208 to display the animated objects as grabbing the hearts with the animated object's mouth. FIGS. 3A-3J below provide an example of different user actions that cause the action module 206 to determine an action and the user interface module 208 to modify a display of the animated object based on the action.

The actions may include taps, swipes, making noise, changing pressure, moving a pointing device (e.g., a mouse moving an arrow), moving the computing device 200, capturing an image, providing a message with a context, providing a message with a word in the message, providing voice content, selecting options provided by the user interface, selecting another animated object, etc.

Turning to FIG. 3A, an example user interface 300 is illustrated of a messaging stream that includes an animated cookie according to some implementations. In this example, the messaging stream may include a list 301 of the users that are participating in the messaging stream. A first user may be associated with a first user icon 302 in the messaging stream. The first user may select an animated cookie 303 as the animated object and the user interface module 208 may display the animated cookie 303 within a word bubble 304.

FIG. 3B illustrates an example user interface 310 of a messaging stream that includes the animated cookie 303 with eyes that follow a cursor 311 controlled by a pointing device that is controlled by a first user according to some implementations. In this example, the user interface module 208 illustrates the cursor 311 with a circle; however, other variations are possible, such as an arrow, a rectangle, etc. The action module 206 determines that a pointing device is moved above the location of the animated cookie 303 in the user interface. This is illustrated in FIG. 3B with the cursor 311 above the animated cookie 303. The action module 206 instructs the user interface module 208 to modify a display of the animated cookie 303. For example, the animated cookie 303 is updated to show animated eyes that move and track the movement of the cursor 311 as the cursor 311 moves above the animated cookie 303.

The animated cookie 303 may follow the location of the cursor 311 with the same speed of movement as the cursor 311. For example, if the cursor 311 moves up and down quickly, the animated cookie 303 may include eyes that are animated to look up and down as quickly as the cursor 311. In some implementations, moving the cursor 311 a particular speed could cause the animated object to react. In this example, moving the cursor 311 around the animated cookie 303 several times may cause the animated cookie 303 to look dizzy, for example, by depicting stars floating around the animated cookie 303.

FIG. 3C illustrates an example user interface 320 of a messaging stream that includes the animated cookie 303 that is viewable by multiple users according to some implementations. In this example, the second user is associated with a second user icon 321 in the messaging stream. The animated cookie 303 remains in the same location because the animated cookie 303 is part of the word bubble 304.

FIG. 3D illustrates an example user interface 330 of a messaging stream that includes the animated cookie 303 with eyes that follow a pointing device 331 controlled by the second user according to some implementations. In this example, the action module 206 determines a location of the cursor 311 and the user interface module 208 modifies the display of the animated cookie 303 to look above and to the left of where the cursor 311 is located.

The second user moves the cursor 311 to the animated cookie 303 in order to move the animated cookie. In this example, the user interface module 208 also includes informative text below the second icon 321 to inform the users that the second user is moving the animated cookie 303.

FIG. 3E illustrates an example user interface 340 of a messaging stream that includes the animated cookie 303 that reacts to being moved according to some implementations. In this example, as the second user moves the animated cookie 303, the user interface module 208 modifies the display of the animated cookie 303 to look as though the cursor 311 is tickling the animated cookie 303 by modifying the animated cookie 303 to have scrunched up eyes and a pursed smiling mouth. Because the second user moved the animated cookie 303 outside of the word bubble associated with the first user, the user interface module 208 creates a third icon 341 associated with the first user that indicates that the first user created the animated cookie by calling the animated cookie 303 an active sticker. The second user may move the animated cookie 303 anywhere within the messaging stream. In some implementations, the animated cookie stays fixed wherever a user places it.

FIG. 3F illustrates an example user interface 350 of a messaging stream that includes an animated cookie 303 that reacts to being placed according to some implementations. The user interface module 208 illustrates the animated cookie 303 as continuing to laugh as if he was tickled by the pointing device. The user interface module 208 also modifies the text below the second icon 321 to inform the other users that the second user placed the animated cookie 303.

Figure 3H:
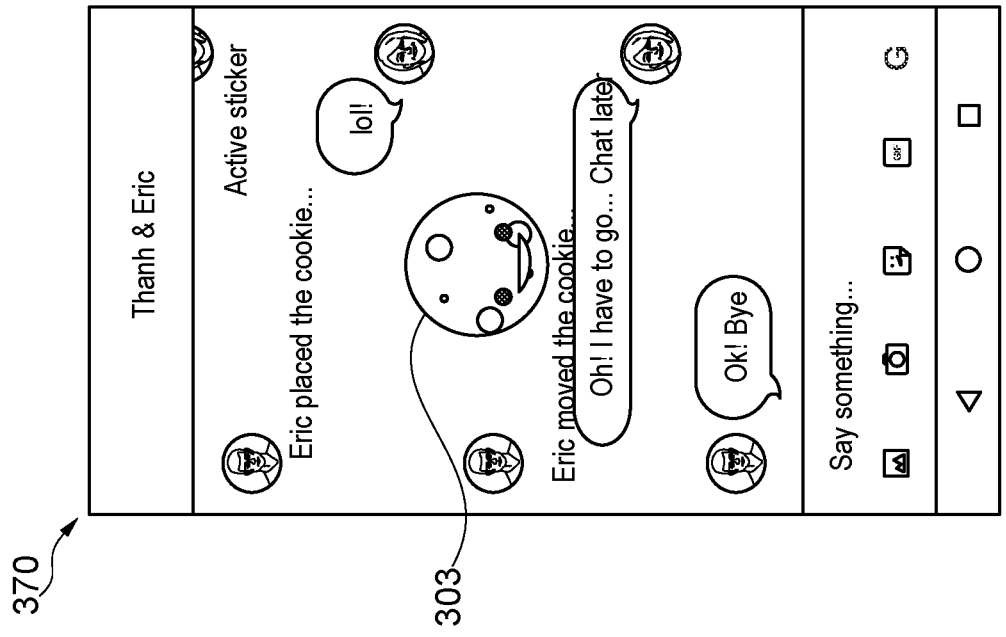
FIG. 3H illustrates an example user interface of a messaging stream that includes the animated cookie that stays in a fixed location within the messaging stream according to some implementations.
Figure 3G:
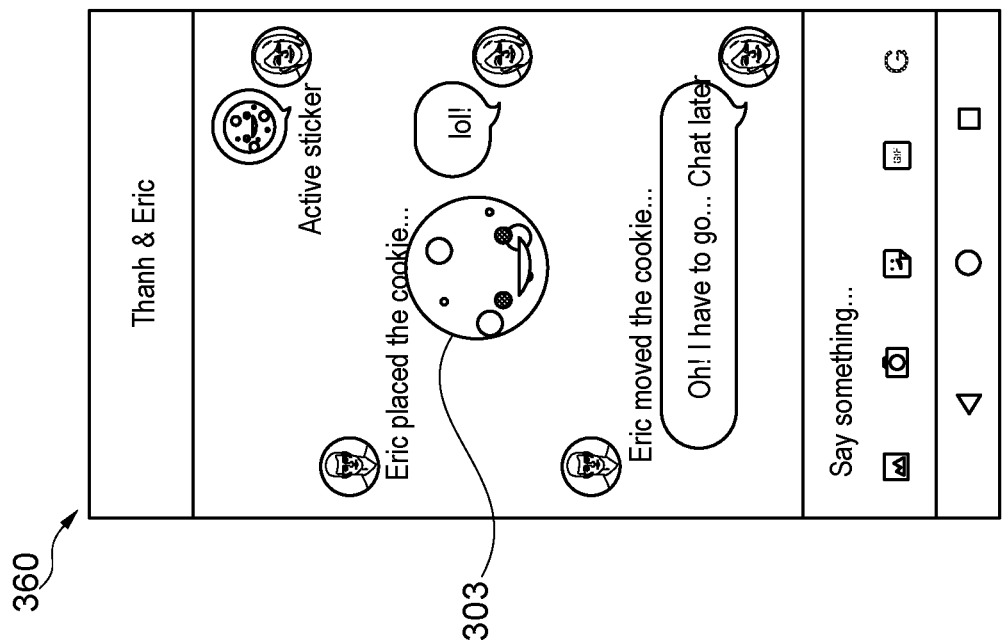
FIG. 3G illustrates an example user interface of a messaging stream that includes the animated cookie with eyes that move to view text displayed within the messaging stream according to some implementations.

FIG. 3G illustrates an example user interface 360 of a messaging stream that includes an animated cookie 303 with eyes that move to view text displayed within the messaging stream according to some implementations. The action module 206 determines that the first user entered text within the messaging stream. The user interface module 208 modifies the animated cookie 303 to move the eye to look downward as if the animated cookie 303 is reading the text. In some implementations, the animated cookie 303 may not access the content of the text, but instead merely reacts to the appearance of text. In some implementations, upon user consent, the animated cookie 303 has access to the text. This feature may be disabled, for example, if the user declines permission for the action module 206 to detect that the user entered text or received a message.

FIG. 3H illustrates an example user interface 370 of a messaging stream that includes an animated cookie 303 that stays in a fixed location within the messaging stream according to some implementations. As more messages are added within the messaging stream, the messages scroll upward. Since the animated cookie 303 is placed in a fixed position, it stays within the center of the messaging stream.

Figure 3J:
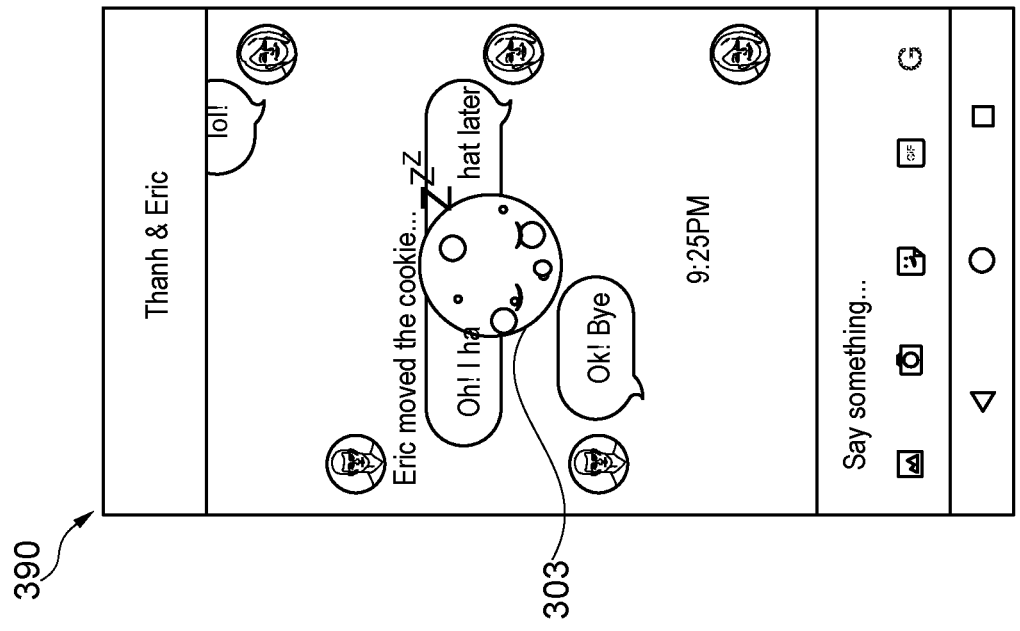
FIG. 3J illustrates an example user interface of a messaging stream that includes the animated cookie that continues to react to the word in the message according to some implementations.
Figure 3I:
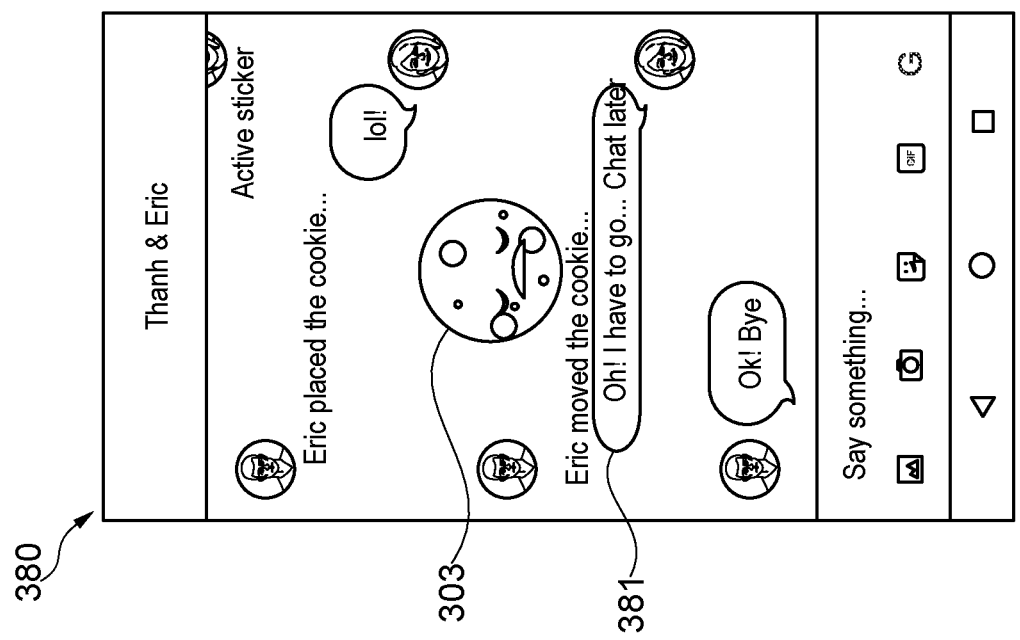
FIG. 3I illustrates an example user interface of a messaging stream that includes an animated cookie that reacts to a word in a message according to some implementations.

FIG. 3I illustrates an example user interface 380 of a messaging stream that includes an animated cookie 303 that reacts to a word in the message 381, if the users participating in the messaging stream provide consent to access the messages exchanged in the messaging stream, according to some implementations. In this example, the first user provides a message that states "Oh! I have to go . . . chat later." Based upon user consent to access the message, the action module 206 determines that the words "I have to go . . . chat later" indicate that the first user is about to end the chat. The action module 206 may determine a reaction for the animated cookie 303 based on the message 381 by using machine learning, comparing words in the message to lists of words associated with different contexts, etc. For example, such a determination may be made by a comparison of one or more of the words with words known to be associated with ending a chat, e.g., based upon prior training data, based upon clustering previous messages, etc. The user interface module 208 modifies the display of the animated cookie 303 to start to fall asleep (e.g., by illustrating droopy eyes) based on the first user's message.

FIG. 3J illustrates an example user interface 390 of a messaging stream that includes the animated cookie 303 that continues to react to the word within the message according to some implementations. The action module 206 determines, when consent is provided by the second user for access to messages in the messaging stream, that the second user is also about to leave the messaging stream based on the words associated with the second user stating "Ok! Bye." Based on the action module 206 determining a meaning of the words, the user interface module 208 modifies the display of the animated cookie 303 to fall asleep (e.g., by displaying the animated cookie 303 saying "ZZZ").

In some implementations, the action from the user includes the user blowing on a computing device 200. For example, the user could blow on a mobile device or blow while wearing a headset. The sensor 245 may include a microphone that detects a change in airflow and transmits information about the change in airflow to the action module 206. The action module 206 may determine a degree of the change in airflow and the action module 206 instructs the user interface module 208 to move the animated object based on the degree of the change in airflow. For example, the animated object may be a box of tissues and blowing on the computing device 200 causes the tissues to move out of the box of tissues. If the user blows slightly on the computing device 200, it causes a few of the tissues from the box of tissues to come out of the box. If the user blows hard on the computing device 200, it causes several of the tissues from the box of tissues to come out of the box. In another example, the animated object is a character, such as a cartoon fox, and blowing on the computing device 200 causes the fox to hang on to the side of the messaging stream window and hold on. In yet another example, the animated object is a bubble and blowing on the computing device 200 makes the bubble increase in size corresponding to the extent of the first user blowing on the computing device 200.

In some implementations, the action from the user includes moving the computing device 200. The action module 206 may receive information from a sensor 245 (e.g., an accelerometer or a gyroscope) and determine a degree of the movement. The action module 206 may instruct the user interface module 208 to illustrate the animated object with additional changes. For example, the user shaking the user's smart watch or other mobile device causes the action module 206 to instruct the user interface module 208 to illustrate items moving, such as snow falling from the sky, nuts and bolts coming loose, a character's hair becoming disarrayed, the character shaking a fist at a user, etc. In another example, when the user moves the computing device 200 to the user's ear, the action module 206 may receive information from the sensor 245 indicating that the user moved the computing device 200 to the user's ear and instruct the speaker 243 to emit a noise. In some examples, the animated object emits a different noise depending on how the computing device 200 is moved, such as a yip if the user moves the computing device 200 to the user's left ear and a bark if the user moves the computing device 200 to the user's right ear.

Figure 4B:
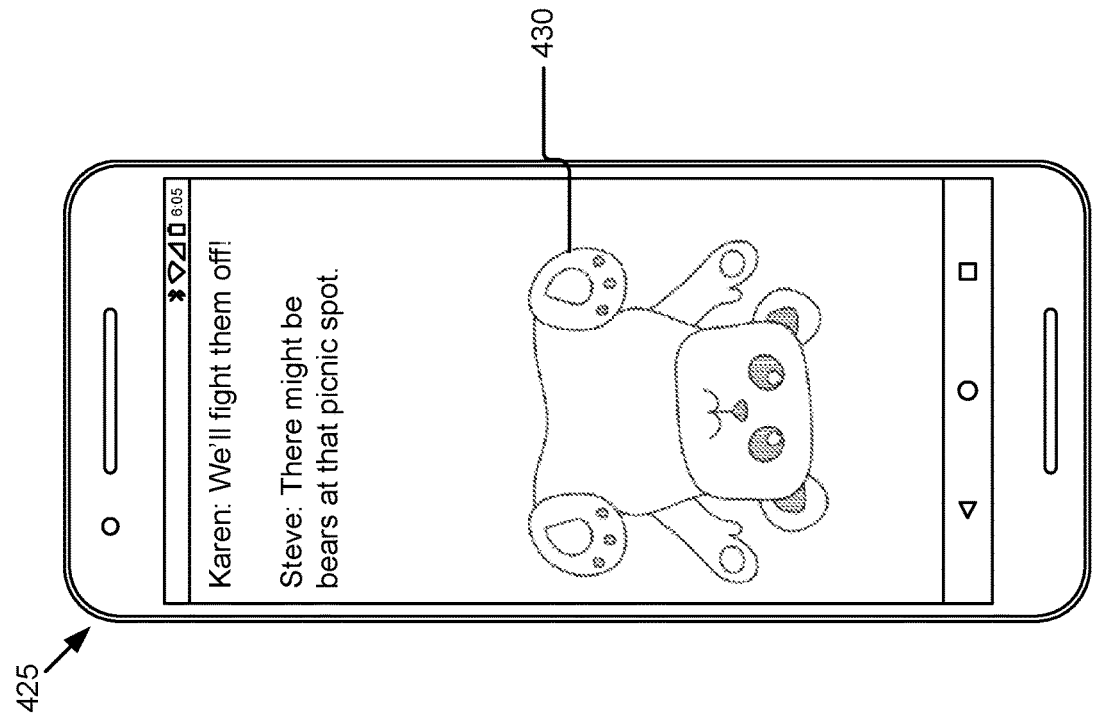
FIG. 4B illustrates an example user interface of the messaging stream that includes the animated bear after a user performed a user action according to some implementations.
Figure 4A:
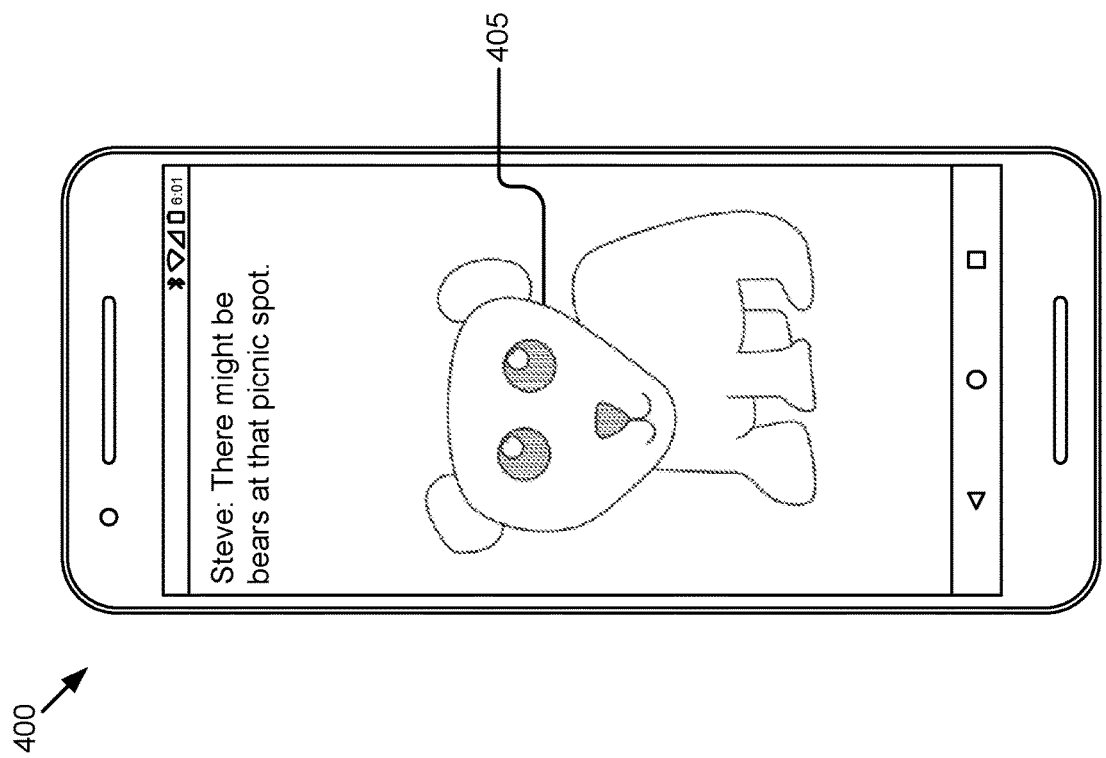
FIG. 4A illustrates an example user interface of a messaging stream that includes an animated bear according to some implementations.

Turning to FIG. 4A, an example user interface 400 of a messaging stream is illustrated that includes an animated bear 405 according to some implementations. A first user may select an animated bear 405 and place the animated bear 405 in the center of the messaging stream below the messages. Upon user consent, the action module 206 may identify that Steve provided a message stating "There might be bears at that picnic spot." The action module 206 may instruct the user interface module 208 to modify the display of the bear by animating the animated bear's 405 eyes to move back and forth to give the appearance that the animated bear 405 is reading the text.

FIG. 4B illustrates an example user interface 425 of the messaging stream that includes the animated bear 430 after a user performed a user action according to some implementations. For example, the second user may turn the user device 115 upside down. The action module 206 receives information from a sensor 245 and determines that the degree of the movement of the user device 115 is 180 degrees. The action module 206 instructs the user interface module 208 to modify the display to show the animated bear 430 as upside down.

In another example, the action module 206, upon user consent, may identify that Karen responded to Steve with "We'll fight them off!" The action module 206 determines that fight is an instruction associated with the animated bear 430 and instructs the user interface module 206 to modify the display of the animated bear 430 to show the animated bear 430 initially fighting and then falling upside down.

In some implementations, the action from the user includes movement within the messaging stream. The movement may be the user touching a touch screen of a mobile device or movement of a pointing device, such as a mouse. The animated object may be a character with eyes (e.g., a smiley face). The action module 206 may receive information about the movement from the sensor 245 (e.g. a touch screen), and determine the direction of the movement. The action module 206 instructs the user interface module 208 to move the eyes of the animated object to correspond to the direction of the movement from the first user. In another example, the movement may stretch the animated object.

Figure 5A:
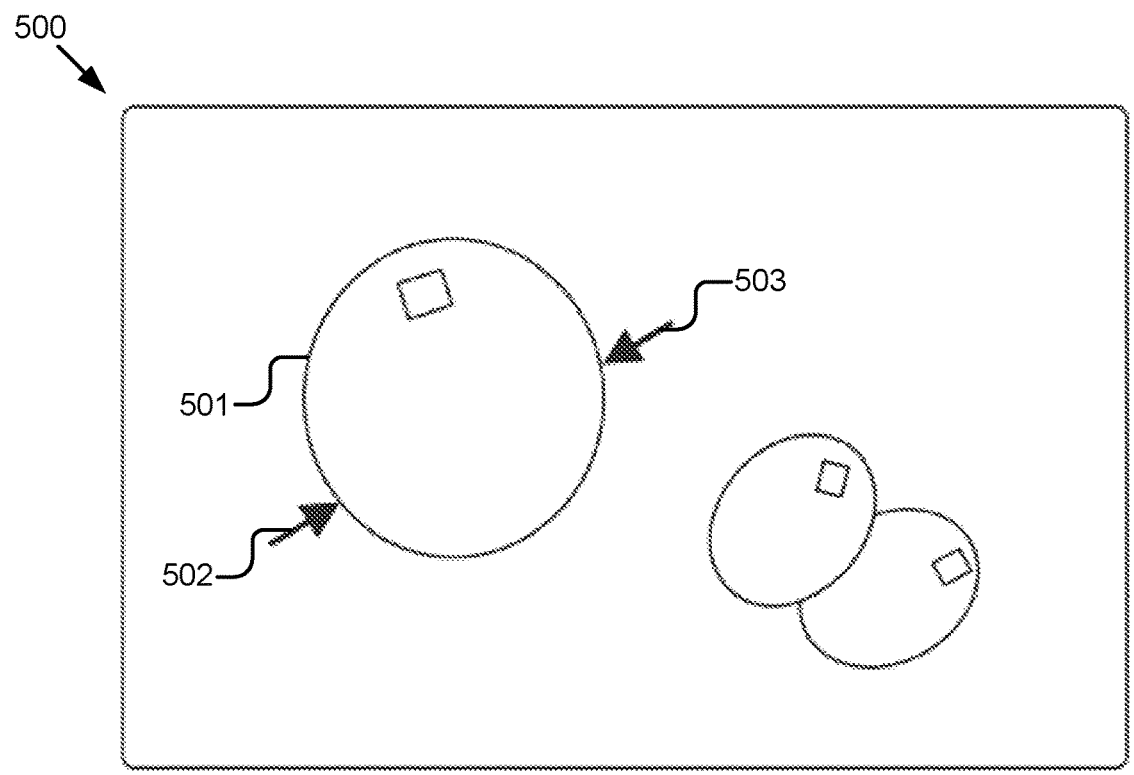
FIG. 5A illustrates an example user interface of a messaging stream that includes animated bubbles according to some implementations.

Turning to FIG. 5A, an example user interface 500 of a messaging stream that includes animated bubbles is illustrated according to some implementations. The first user uses a pointing device associated with a computing device 200 to pull a first arrow 502 in a first direction. The second user uses a pointing device associated with another computing device 200 to pull a second arrow 503 in a second direction. Both the first arrow 502 and the second arrow 503 are pulling the bubble 501 in a different direction. The action module 206 identifies the first action and the second action as pulling the bubble 501 in a tug of war by pulling in opposite directions.

Figure 5B:
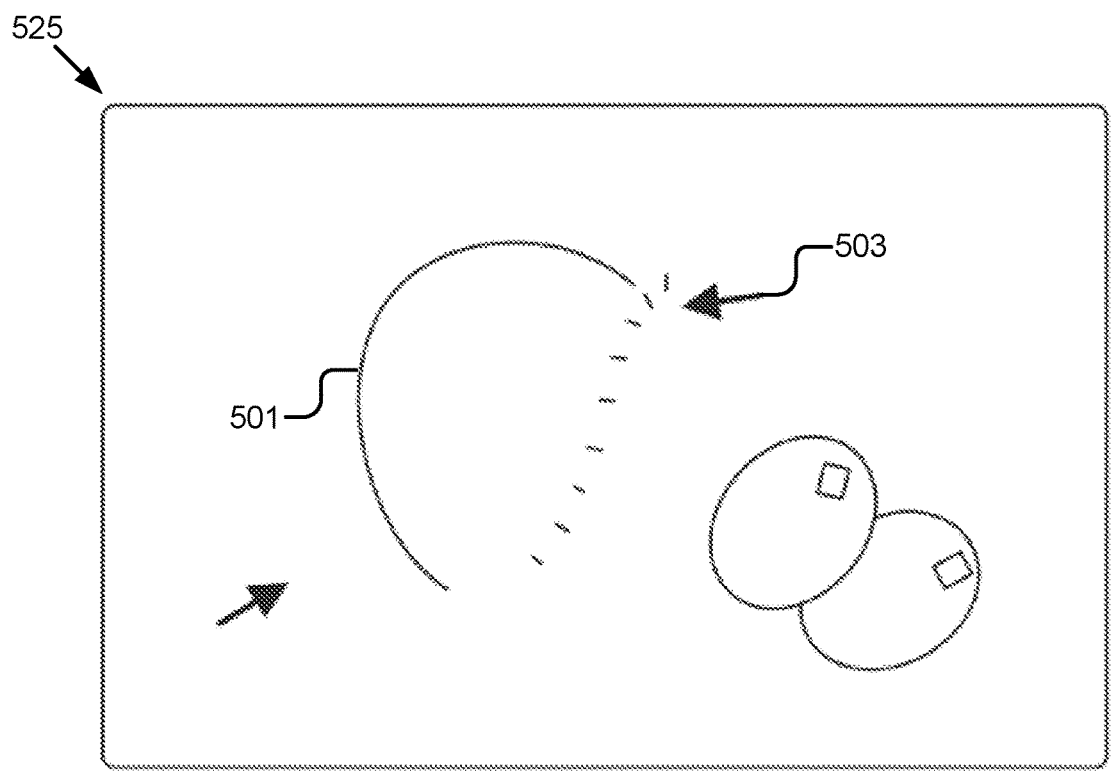
FIG. 5B illustrates the example user interface of the messaging stream that includes the animated bubbles after two users performed user actions according to some implementations.

FIG. 5B illustrates the example user interface 525 of the messaging stream that includes the animated bubbles after two users performed user actions according to some implementations. The action module 206 determines how much each of the users pulls the bubble with the first arrow 502 and the second arrow 503. In some implementations, the action module 206 applies animation rules to determine a winner of the tug of war by determining whether the first user or the second user first pulled the bubble a threshold number of pixels in the user interface. Other ways to determine a winner are possible, such as determining which user stretched the bubble a threshold pixel distance outside of a boundary.

In some implementations, when participant users in the messaging stream consent to such use of messages, the action module 206 identifies a word in a message or a context of the messaging stream. The action module 206 may compare words in a message to a list of words associated with different meanings, such as different emotions (e.g., happy, sad, angry, etc.), different states (e.g., about to end the chat), etc. The action module 206 may use machine learning to predict a meaning associated with a user based on the message where the machine learning may be based on all messages available to the action module 206 or, subject to user content, the messages associated with a particular user. The context of the messaging stream may be based on user patterns, a time of day, a location of the computing device 200, etc. and is determined only upon specific user consent to access such data. For example, where a user typically ends a messaging stream at the end of a workday. As a result, the action module 206 may instruct the user interface module 208 to modify a display of the animated object based on the context.

In some implementations, the action module 206 may, responsive to user content, identify voice content from the user. The action module 206 may convert the speech to text and identify an indent of the voice content. For example, the action module 206 may identify the user providing verbal instructions for an abstract animated object that includes "Jump around." Based on the verbal content, the action module 206 instructs the user interface to modify the display of the abstract animated object to show it moving up and down.

In some implementations, a first user may be a chat bot (e.g., an automated chat program) that provides services to a user. The animated object may be related to one or more messages exchanges between the chat bot and the user. For example, the user may instruct the chat bot to make a reservation, a purchase, etc. by entering a message. The action module 206 may, upon user consent, instruct the user interface module 208 to modify the animated object based on the message. For example, if the user instructs the chat bot to make a reservation, the animated object includes a graphic associated with making a reservation.

Figure 6:
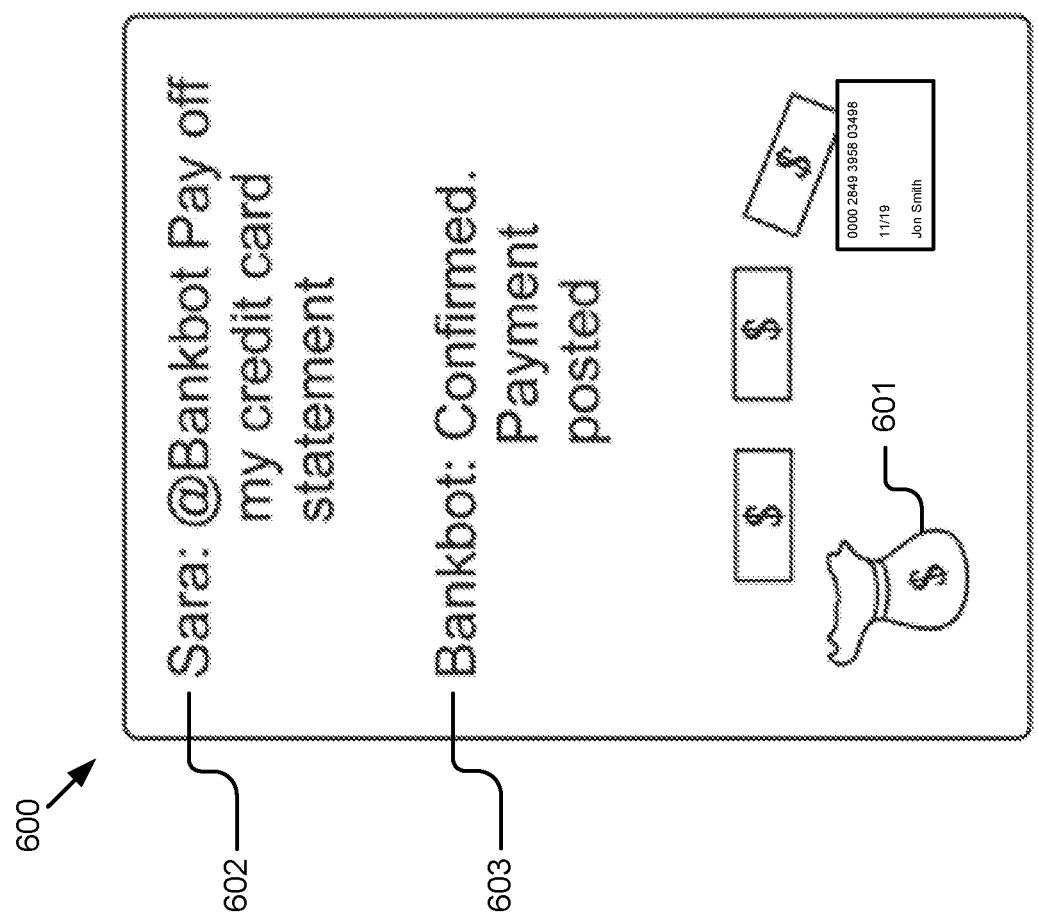
FIG. 6 illustrates an example user interface of a messaging stream that includes an animated money transfer object according to some implementations.

Turning to FIG. 6, an example user interface 600 of a messaging stream is illustrated that includes an animated money transfer object 601 according to some implementations. In this example, user Sara consents to the use of a chat bot to perform actions for her by instructing the Bankbot to pay off a credit card statement. The user provides a message 602 that states: "@Bankbot Pay off my credit card statement." The Bankbot responds with a message 603 that states: "Confirmed. Payment posted." Upon user consent for the action module 206 to access the user's message, the action module 206 determines that the user instructed the chat bot to transfer money from the user's account to a credit card company. The action module 206 instructs the user interface module 208 to display an animated money transfer object 601 that shows money moving from a money bag to a credit card.

In some implementations, various examples described above may be combined. For example, a messaging stream may include multiple users and a chat bot. The action module 206 may detect a movement of a user on the computing device 200 and instruct the user interface module 208 to modify a display of the animated object based on messages related to the chat bot and the movement of the user.

Figure 7B:
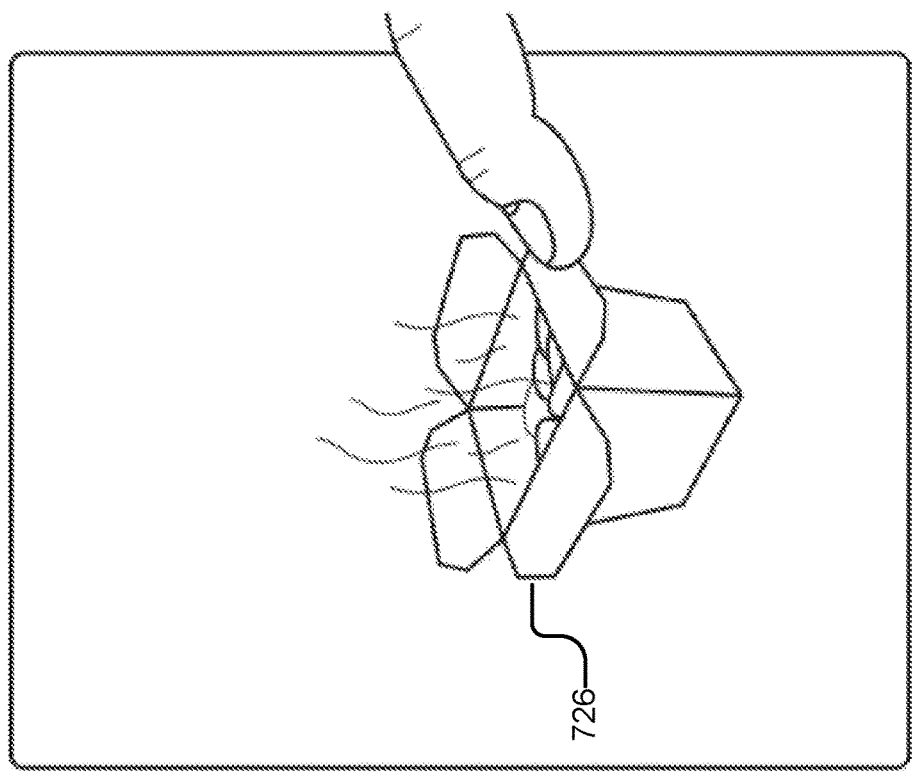
FIG. 7B illustrates the example user interface of the animated takeout box after a user performed a user action according to some implementations.
Figure 7A:
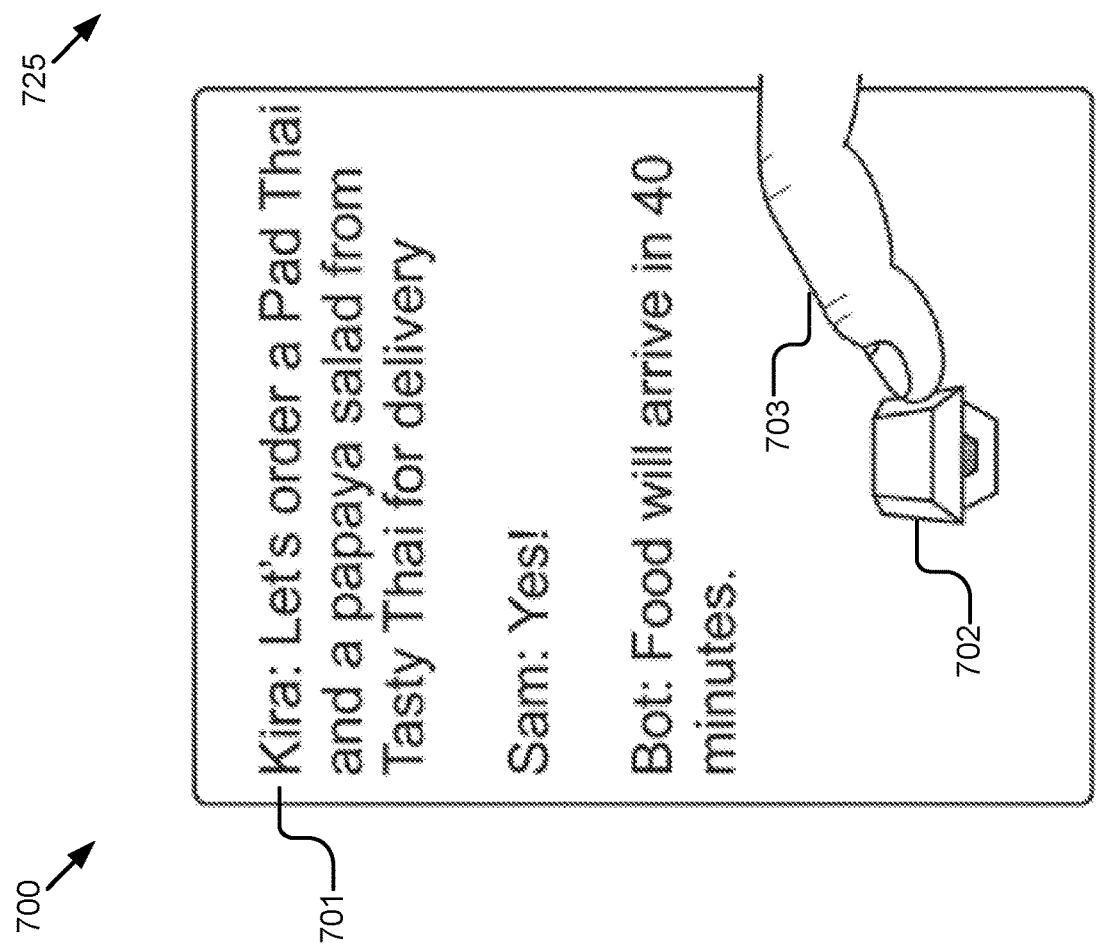
FIG. 7A illustrates an example user interface of an animated takeout box according to some implementations.

Turning to FIG. 7A, an example user interface 700 of an animated takeout box is illustrated according to some implementations. In this example, Kira and Sam exchange messages 701 about ordering delivery food from Tasty Thai. The users also consent to the chatbot accessing their messages to help the users. A food ordering chatbot places the order and informs the users that the food will arrive in 40 minutes. The first user selects a takeout box animated object 702, which the user interface module 208 displays in the messaging stream. The second user touches the takeout box animated object 702 with a finger 703. The action module 206 detects movement of the second user's finger 703 touching the animated object.

FIG. 7B illustrates the example user interface 725 of the animated takeout box after a user performed a user action according to some implementations. Based on the second user touching the takeout box animated object 702 in FIG. 7A, the action module 206 determines the type of action that occurred and instructs the user interface module 208 to modify the takeout box animated object to display an opened takeout box animated object 726.

In some implementations, the action may include a second user selecting a second animated object. The second animated object may be from a subset of animated objects based on its relationship to a first animated object. The second animated object may be selected from a group of all animated objects. In some implementations, the user interface module 208 modifies a display by showing the first animated object interacting with the second animated object. For example, the first animated object may be a fox with boxing gloves and the second animated object may be a kangaroo with boxing globes. The user interface module 208 may display the two animated objects fighting with each other. In some implementations, the first user may control the first animated object and the second user may control the second animated object such that the first and second user engage in a boxing match using the two animated objects.

In some implementations where multiple animated objects are displayed in the messaging stream, the animated objects react differently depending on how they were added to the messaging stream. Two animated objects may react differently depending on their proximity to each other and a length of time, such that animated objects that are close to each other react to each other more than animated objects that are far away from each other. For example, when two animated people are next to each other they look at each other and touch each other. When the two animated people are at opposite sides of the messaging stream, they wave every two minutes but otherwise do not interact.

The user interface module 208 generates a user interface. In some implementations, the user interface module 208 includes a set of instructions executable by the processor 235 to generate the user interface. In some implementations, the user interface module 208 is stored in the memory 237 of the computing device 200 and can be accessible and executable by the processor 235.

In some implementations, the user interface module 208 receives instructions from the animation module 204 to generate a user interface that includes a messaging stream. The user interface may include a group of animated objects for a first user to choose from. The user interface module 208 may receive a selection from the first user of one of the animated objects. The user interface module 208 displays the animated object in the messaging stream.

The user interface module 208 receives instructions from the action module 206 to modifying a display of the animated object based on a first action from the first user. For example, the user interface module 208 receives instructions to modify an animated object of marbles to show them rolling around the messaging stream based on movement of a computing device associated with the first user. The user interface module 208 receives instructions from the action module 206 to modify the display of the animated object based on a second action from a second user. For example, the user interface module 208 receives instructions to show the marbles bouncing in the messaging stream based on the second user touching a computing device 200 associated with the second user to simulate the marbles bouncing within the messaging stream.

In some implementations, the user interface module 208 provides a user interface that includes interactive features to change the appearance of the animated object. For example, the user interface module 208 provides a user interface that provides a scratchpad for drawing. The scratchpad may include a toolkit with various tools for drawing such as a pencil, a paintbrush, color options, etc. In another example, the user interface module 208 provides a user interface that includes an interactive keyboard for producing music, beeps, tones, etc. When a user touches a key on the keyboard, the action module 206 detect the touch and instructs the speaker 243 to emit a beep, tone, etc. In yet another example, the user interface module 208 provides a user interface that includes interactive graphics, such as charts, timelines, etc. where the user has options for changing the appearance of the interactive graphics.

Figure 8A:
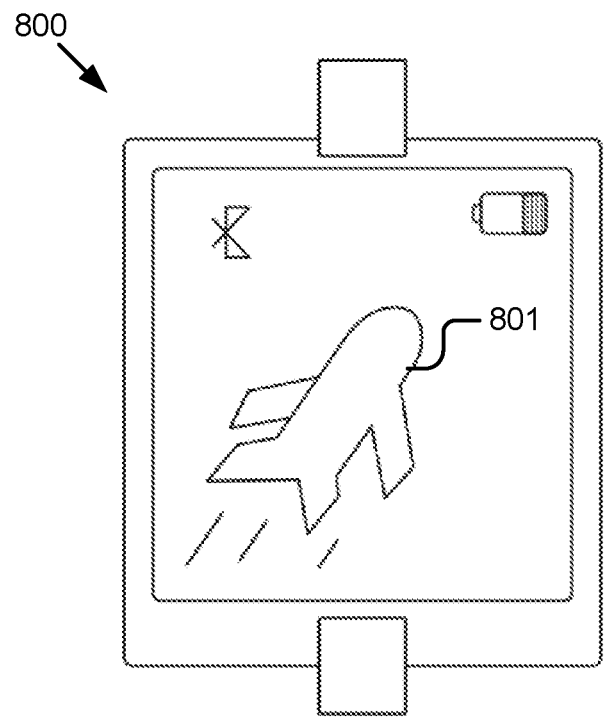
FIG. 8A illustrates an example user interface of a messaging stream that includes an animated airplane according to some implementations.

FIG. 8A illustrates an example user interface 800 of a messaging stream that includes an animated airplane according to some implementations. In this example, a first user selects an animated object of an airplane 801, which represents a message to the second user that the first user is about to get on an airplane. The first user swipes across a screen of the smartwatch to cause the user interface module 208 to modify the display of the airplane 801 to show the airplane 801 moving across the screen. The animation module 204 provides the second user with a set of animated objects based on their relationship to the airplane 801. For example, the set of animated objects could be a hand waving, a thumbs up, and two people kissing. The second user selects the animated object of two people kissing.

Figure 8B:
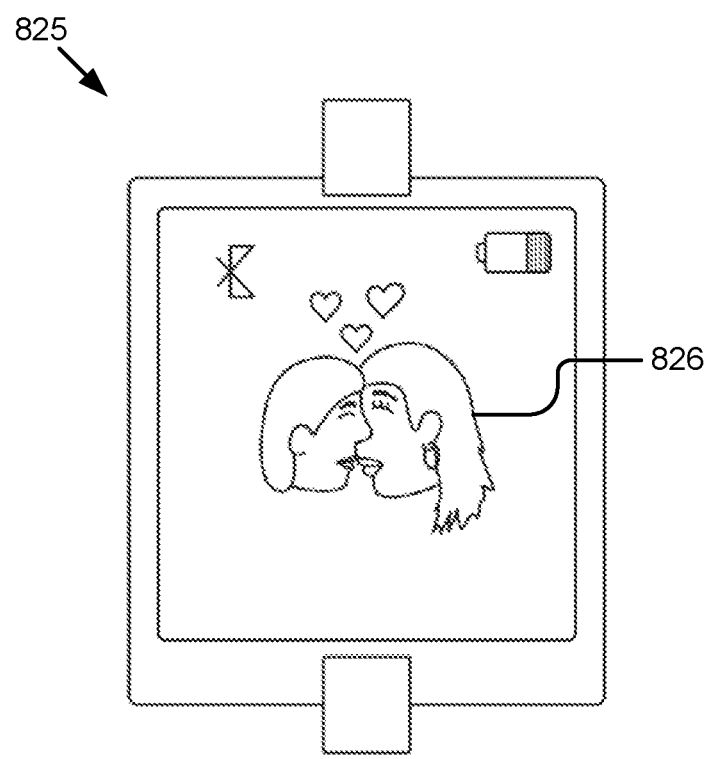
FIG. 8B illustrates an example user interface of the messaging stream that includes an animated couple that is displayed responsive to a user action related to the animated airplane according to some implementations.

FIG. 8B illustrates an example user interface 825 of the messaging stream that includes an animated couple 826 that is displayed responsive to a user action related to the animated airplane according to some implementations. In this example, the user action is the second user selecting the animated object of the two people kissing.

Example Method

Figure 9:
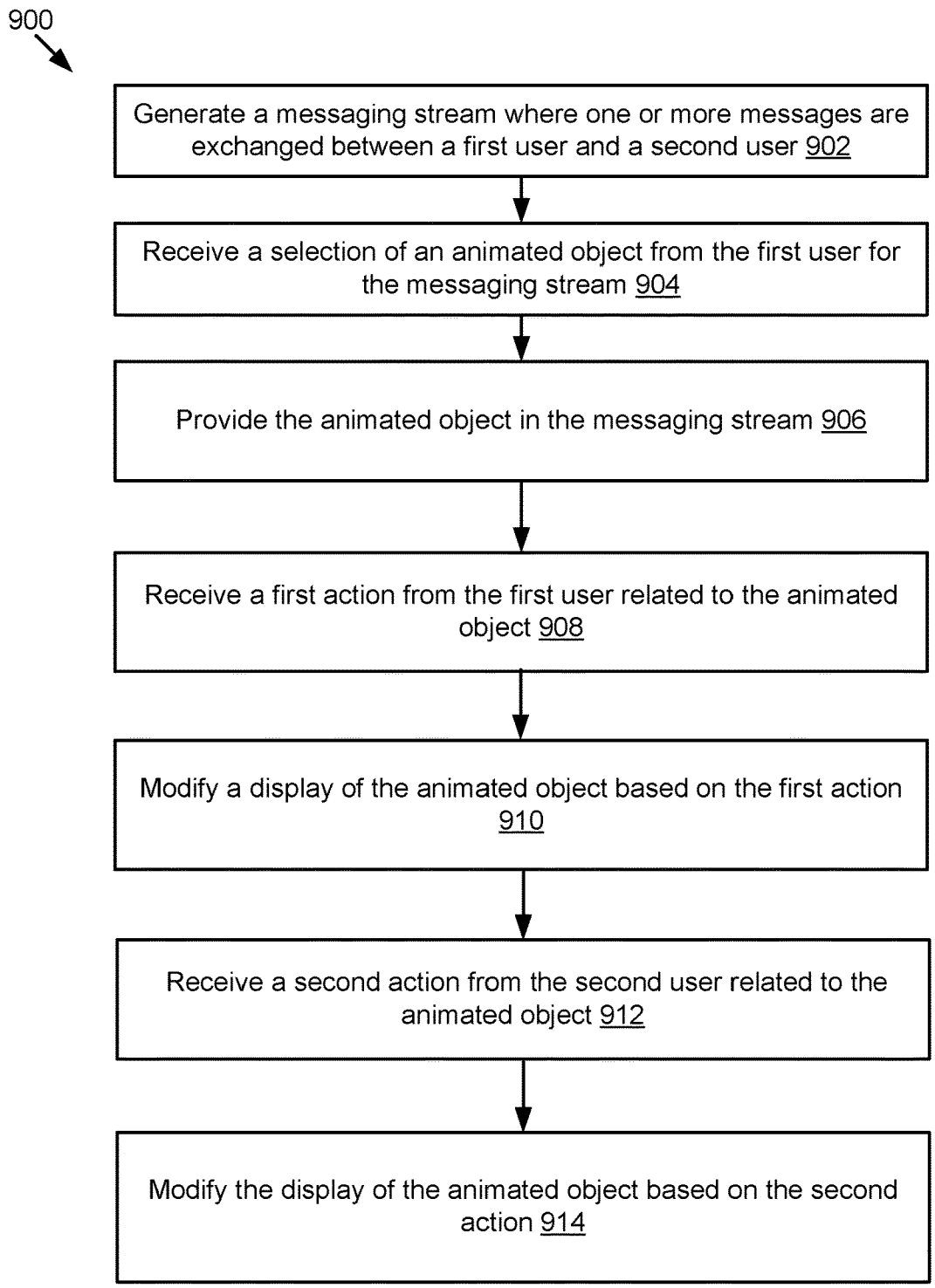
FIG. 9 illustrates a flowchart of an example method to generate a messaging stream that includes an animated object.

FIG. 9 illustrates a flowchart of an example method 900 to generate a messaging stream that includes an animated object. The method 900 is performed by a messaging application 103 stored on a computing device 200, such as a user device 115, a messaging server 101, or in part a user device 115 and in part a messaging server 101.

At block 902, a messaging stream is generated where one or more messages are exchanged between a first user and a second user. For example, the first user and the second user send messages to each other using an instant messaging platform, via text, via SMS, etc. At block 904, a selection is received of an animated object from the first user for the messaging stream. For example, the first user selects the animated object from a group of animated objects that are displayed for the first user's device. For example, the animated object is an animated version of a flamingo. The user may customize the animated object by choosing a color for the animated object, a style of eyes for the animated object, etc. At block 906, the animated object is provided in the messaging stream. For example, the user interface module 208 displays the animated object in a default location, such as the center of the user interface.

At block 908, a first action is received from the first user related to the animated object. For example, the action module 206 detects the first user blowing into a sensor 245, such as a microphone, of the computing device 200. At block 910, a display of the animated object is modified based on the first action. For example, based on the first user blowing into the computing device 200, the user interface module 208 modifies the display of the animated object to show the flamingo blowing around in the wind with his feathers flying.

At block 912, a second action is received from the second user related to the animated object. For example, the second user shakes the second user's computing device 200. At block 914, the display of the animated object is modified based on the second action. For example, the display is modified to show the flamingo bouncing up and down with movement corresponding to the shaking of the second user's computing device 200.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the implementations can be described above primarily with reference to user interfaces and particular hardware. However, the implementations can apply to any type of computing device that can receive data and commands, and any peripheral devices providing services.

Reference in the specification to "some implementations" or "some instances" means that a particular feature, structure, or characteristic described in connection with the implementations or instances can be included in at least one implementation of the description. The appearances of the phrase "in some implementations" in various places in the specification are not necessarily all referring to the same implementations.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The implementations of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMs, EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations or some implementations containing both hardware and software elements. In some implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

In situations in which the systems discussed above collect or use personal information, the systems provide users with an opportunity to control whether programs or features collect user information (e.g., information about a user's social network, social actions or activities, profession, a user's preferences, or a user's current location), or control whether and/or how to receive content from the server that may be more relevant to the user. In addition, certain data may be treated in one or more ways before it is stored or used, so that personally identifiable information is removed. For example, a user's identity may be treated so that personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the server.

What is claimed is:

1. A computer-implemented method comprising:
    generating a messaging stream where one or more messages are exchanged between a bot and a user;
    receiving a message from the user to the bot;
    determining that the message is a request for a service to be provided by the bot;
    providing an animated object in the messaging stream, wherein the animated object includes a graphical representation of a product associated with the service; and
    modifying a display of the animated object based on a request for the service to show motion of the product.

2. The method of claim 1, further comprising:
    detecting movement of a finger on a touch screen or movement of a pointing device; and
    further modifying the display of the animated object based on detecting the movement.

3. The method of claim 2, wherein further modifying the display of the animated object based on detecting the movement includes the graphical representation of the product opening responsive to the movement of being indicative of the user input touching the graphical representation of the product.

4. The method of claim 1, wherein the service is related to a money transfer and the animated object is an illustration of the money transfer.

5. The method of claim 1, further comprising:
    comparing words in the one or more messages to a list of words associated with different emotions to identify a particular emotion in the one or more messages; and
    modifying the display of the animated object to reflect the particular emotion identified from the list of words.

6. The method of claim 1, wherein modifying the display of the animated object occurs responsive to the bot completing the service.

7. The method of claim 1, further comprising receiving an instruction from the user to move a placement of the animated object in the messaging stream.

8. A non-transitory computer-readable medium with instructions stored thereon that, when executed by one or more computers, cause the one or more computers to perform operations comprising;
    generating a messaging stream where one or more messages are exchanged between a bot and a user;
    receiving a message from the user to the bot;
    determining that the message is a request for a service to be provided by the bot;
    providing an animated object in the messaging stream, wherein the animated object includes a graphical representation of a product associated with the service; and
    modifying a display of the animated object based on a request for the service to show motion of the product.

9. The computer-readable medium of claim 8, wherein the operations further comprise:
    detecting movement of a finger on a touch screen or movement of a pointing device; and
    further modifying the display of the animated object based on detecting the movement.

10. The computer-readable medium of claim 8, wherein further modifying the display of the animated object based on detecting the movement includes the graphical representation of the product opening responsive to the movement of being indicative of the user input touching the graphical representation of the product.

11. The computer-readable medium of claim 8, wherein the service is related to a money transfer and the animated object is an illustration of the money transfer.

12. The computer-readable medium of claim 8, wherein the operations further comprise:
comparing words in the one or more messages to a list of words associated with different emotions to identify a particular emotion in the one or more messages; and
modifying the display of the animated object to reflect the particular emotion identified from the list of words.

13. The computer-readable medium of claim 8, wherein modifying the display of the animated object occurs responsive to the bot completing the service.

14. The computer-readable medium of claim 8, wherein the operations further comprise receiving an instruction from the user to move a placement of the animated object in the messaging stream.

15. A system comprising;
one or more processors; and
a memory coupled to the one or more processors that stores instructions that, when executed by the one or more processors, cause the one or more processors to perform operations comprising:
generating a messaging stream where one or more messages are exchanged between a bot and a user;
receiving a message from the user to the bot;
determining that the message is a request for a service to be provided by the bot;
providing an animated object in the messaging stream, wherein the animated object includes a graphical representation of a product associated with the service; and
modifying a display of the animated object based on a request for the service to show motion of the product.

16. The system of claim 15, wherein the operations further comprise:
detecting movement of a finger on a touch screen or movement of a pointing device; and
further modifying the display of the animated object based on detecting the movement.

17. The system of claim 16, wherein further modifying the display of the animated object based on detecting the movement includes the graphical representation of the product opening responsive to the movement of being indicative of the user input touching the graphical representation of the product.

18. The system of claim 15, wherein the service is related to a money transfer and the animated object is an illustration of the money transfer.

19. The system of claim 15, wherein the operations further comprise:
comparing words in the one or more messages to a list of words associated with different emotions to identify a particular emotion in the one or more messages; and
modifying the display of the animated object to reflect the particular emotion identified from the list of words.

20. The system of claim 15, wherein the operations further comprise receiving an instruction from the user to move a placement of the animated object in the messaging stream.

\* \* \* \* \*